US012619458B2

(12) United States Patent
Dunn et al.

(10) Patent No.: US 12,619,458 B2
(45) Date of Patent: May 5, 2026

(54) INTERRUPTION DETECTION DURING AUTOMATED WORKFLOW

(71) Applicant: Microsoft Technology Licensing, LLC, Redmond, WA (US)

(72) Inventors: Micheal Dunn, Redmond, WA (US); Nabeel Shahzad, Sammamish, WA (US); Sri Raghu Malireddi, Bellevue, WA (US); Jonathan W. Lin, Seattle, WA (US); Olutayo Falase, Seattle, WA (US); Deyuan Ke, Redmond, WA (US); Joann T. Lee, Redmond, WA (US); Shrey Shah, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 733 days.

(21) Appl. No.: 17/726,053

(22) Filed: Apr. 21, 2022

(65) Prior Publication Data
US 2023/0342188 A1     Oct. 26, 2023

(51) Int. Cl.
*G06F 9/48* (2006.01)
*G06F 40/205* (2020.01)
*G06F 40/35* (2020.01)

(52) U.S. Cl.
CPC .......... *G06F 9/4831* (2013.01); *G06F 40/205* (2020.01); *G06F 40/35* (2020.01)

(58) Field of Classification Search
CPC ....... G06F 9/4831; G06F 40/35; G06F 40/205
See application file for complete search history.

(56) References Cited

U.S. PATENT DOCUMENTS

| | | | | |
|---|---|---|---|---|
| 7,680,683 B2 * | 3/2010 | Hilerio | ............... | G06Q 10/0633 705/7.27 |
| 8,682,142 B1 * | 3/2014 | Boskovitz | ............ | G11B 27/034 386/282 |

(Continued)

FOREIGN PATENT DOCUMENTS

CN            108496329 A        9/2018

OTHER PUBLICATIONS

Mehta et al.; "DOM Tree Based Approach for Web Content Extraction"; 2015 International Conference on Communication, Information & Computing Technology (ICCICT); IEEE 2015; (Mehta_2015.pdf) (Year: 2015).*

(Continued)

*Primary Examiner* — Hiren P Patel
(74) *Attorney, Agent, or Firm* — Shook, Hardy & Bacon L.L.P.

(57) ABSTRACT

Systems and methods are provided for detecting an interruption during an automated workflow. An automated workflow may comprise a series of actions to be performed by or with the assistance of a computer. A workflow manager executes a workflow by progressing through a series of workflow states according to instructions associated with the workflow. When the workflow advances to a new state, an interruption detection engine determines whether the state contains an interruption by examining one or more attributes of the workflow state and/or the user interface associated therewith. An interruption detecting engine may examine a document object model and/or utilize computer vision to determine whether an interruption has occurred. When an interruption is detected, a workflow is paused until the interruption is resolved, such as by a user providing a required input. After an interruption has been resolved, the resumes and continues until completion of the workflow.

20 Claims, 10 Drawing Sheets

(56)                References Cited

U.S. PATENT DOCUMENTS

| | | | | |
|---|---|---|---|---|
| 8,849,691 | B2* | 9/2014 | Sanabria | G06Q 10/06 |
| | | | | 705/7.26 |
| 9,058,515 | B1* | 6/2015 | Amtrup | H04N 1/387 |
| 9,185,107 | B2 | 11/2015 | Todorov | |
| 9,208,324 | B2 | 12/2015 | Chauhan et al. | |
| 11,003,748 | B2 | 5/2021 | Oliker et al. | |
| 11,232,503 | B1 | 1/2022 | Rodriguez | |
| 2003/0023622 | A1* | 1/2003 | Obermeyer | G06Q 10/10 |
| | | | | 715/229 |
| 2006/0184883 | A1* | 8/2006 | Jerrard-Dunne | G06Q 10/0633 |
| | | | | 709/219 |
| 2007/0112829 | A1* | 5/2007 | Sanabria | G06Q 10/06316 |
| | | | | 707/999.102 |
| 2009/0112873 | A1* | 4/2009 | Nanjangud Bhaskar | |
| | | | | G06F 8/10 |
| 2012/0116980 | A1* | 5/2012 | Mercuri | G06Q 10/103 |
| | | | | 705/301 |
| 2012/0297190 | A1* | 11/2012 | Shen | H04L 9/0866 |
| | | | | 713/168 |
| 2013/0067368 | A1* | 3/2013 | Mihara | G06Q 10/103 |
| | | | | 715/764 |
| 2014/0330835 | A1* | 11/2014 | Boyer | G06F 16/2379 |
| | | | | 707/741 |
| 2016/0239275 | A1* | 8/2016 | Singh | H04L 67/56 |
| 2018/0004803 | A1* | 1/2018 | Hao | G16H 70/20 |
| 2018/0204263 | A1* | 7/2018 | Buezas | G06Q 30/0619 |
| 2020/0110781 | A1 | 4/2020 | Staszak et al. | |
| 2020/0326988 | A1* | 10/2020 | Lee | G06F 9/44584 |
| 2021/0044637 | A1 | 2/2021 | Lee et al. | |
| 2021/0064739 | A1* | 3/2021 | Chu | G06F 9/547 |
| 2021/0094176 | A1* | 4/2021 | Rusanu | G06F 9/485 |
| 2021/0146546 | A1 | 5/2021 | Linkowski et al. | |
| 2021/0149784 | A1* | 5/2021 | Soorya | G06F 9/5077 |
| 2021/0272172 | A1 | 9/2021 | Manders et al. | |
| 2022/0076315 | A1 | 3/2022 | Angeli et al. | |
| 2022/0230112 | A1* | 7/2022 | Nayak | G06Q 10/067 |

OTHER PUBLICATIONS

Anitha, et al., "Graphical Password Authentication Using for Multistage Image Recognition Captcha", In Proceedings of International Journal of Computer Science and Engineering Communications, vol. 3, Issue 2, 2015, pp. 657-662.

Blessing, et al., "Security Survey and Analysis of Vote-by-Mail Systems", In Repository of arXiv:2005.08427v1, May 18, 2020, pp. 1-18.

"International Search Report and Written Opinion Issued in PCT Application No. PCT/US23/012367", Mailed Date: Jun. 1, 2023, 11 Pages.

Stocco, et al., "Visual Web Test Repair", In Proceedings of the 26th ACM Joint Meeting on European Software Engineering Conference and Symposium on the Foundations of Software Engineering, Nov. 4, 2018, pp. 503-514.

* cited by examiner

300

302 — EXTRACT DOM

304 — IDENTIFY OBJECT OF INTEREST

306 — EXAMINE OBJECT ATTRIBUTES

308 — IDENTIFY INTERRUPTION

900

INTERRUPTION DETECTION DURING AUTOMATED WORKFLOW

BACKGROUND

Computer programs for automating a series of one or more computer tasks enable users to perform certain actions with reduced or minimal need for user input or interaction. In the process of performing these tasks, though, the program may encounter a point at which user input or interaction is required to proceed, at which point it would be advantageous if the program were able to detect this interruption and pause the automation until appropriate user input has been received.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure relate to detecting an interruption during an automated workflow. An automated workflow may be a series of actions performed by or with the assistance of a computer. Performing the automated workflow may involve proceeding through one or more workflow states. A workflow manager may proceed through the workflow states by interacting with one or more resources, such as a web site, a mobile application, or a database, to perform the actions associated with the workflow and to progress through the workflow states. At one or more points during the automated workflow, the workflow manager may encounter an interruption that prevents the workflow from proceeding to the next workflow state. Certain interruptions, such as a CAPTCHA, may require user input to resolve the interruption and continue the automated workflow.

An interruption detection engine monitors the progress of the automated workflow from one state to the next and evaluates the workflow states to determine when an interruption has occurred. The interruption detection engine may employ a range of techniques to perform interruption detection, including without limitation techniques to examine a document object model associated with a workflow state and/or computer vision techniques to examine a user interface of a workflow state. When an interruption is detected, the workflow may be paused and the interruption presented to a user for resolution of the interruption (e.g., by providing the required user input). Upon resolution of the interruption, the workflow manager resumes the workflow and the automated workflow may progress to completion.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
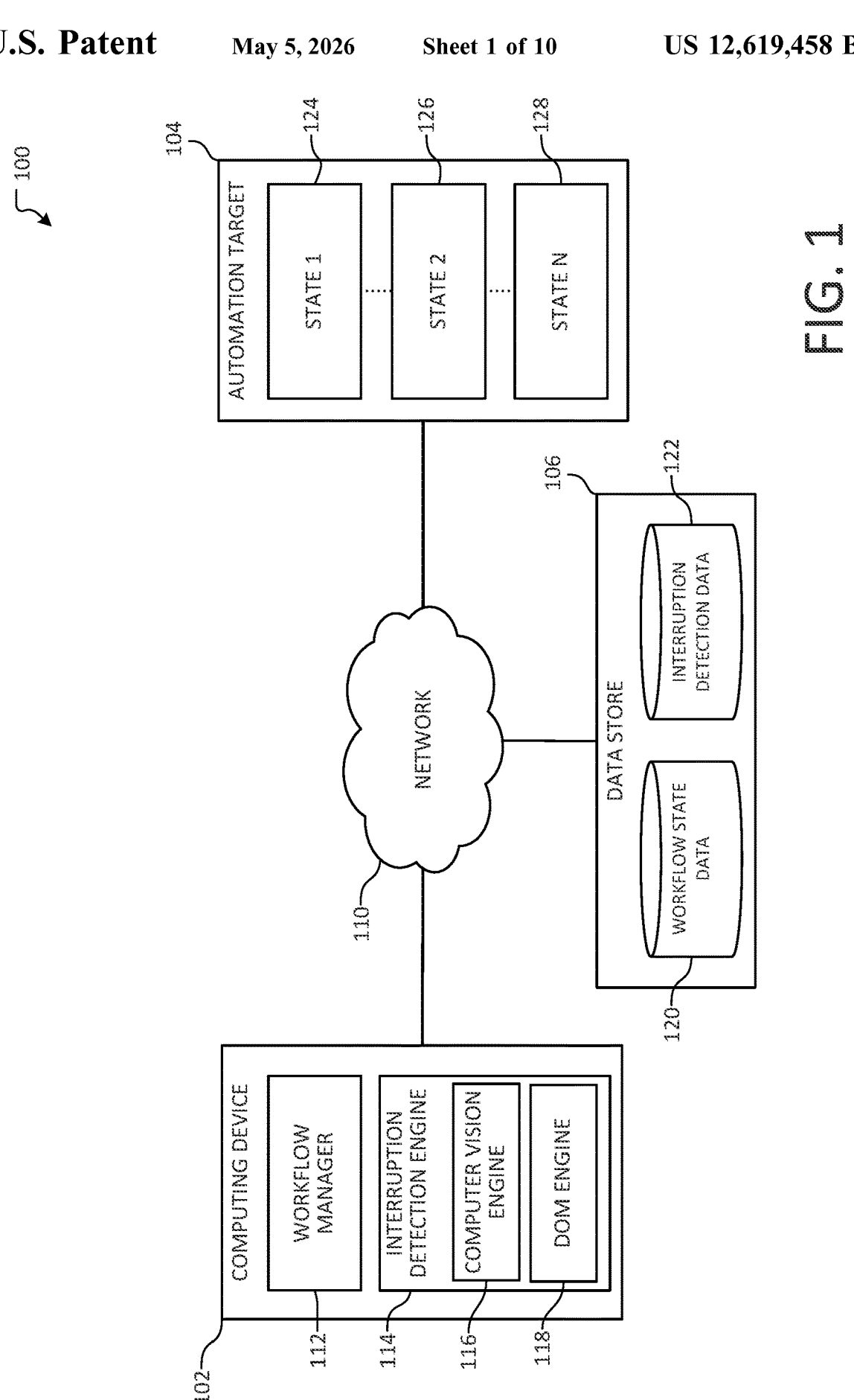
FIG. 1 illustrates an overview of an example system for an automated workflow according to aspects described herein.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

In examples, a computing device may perform workflow automation. As used herein, a workflow may refer to a series of one or more actions performed in a computing environment. Workflow automation, as used herein, refers to the automation of this series of actions. As will be appreciated by one of skill in the art, automation may refer to the complete removal of user interaction from a workflow, such that the automation, upon appropriate user instruction, performs all of the actions in the workflow without any further user interaction. However, one skilled in the art will also appreciate that automation may refer to a change in the amount or the type of user interaction required during a workflow. Accordingly, in non-limiting examples, an automated workflow may encompass any series of actions in which some or all of the actions are wholly or partially performed by a computer rather than by a user.

In examples, the series of actions comprising the automated workflow may be defined with reference to one or more workflow states. As used herein, a state may be an element or stage of an automated task or workflow, including the position at the moment of the automation. For example, a workflow state may occur before the login stage of a workflow, at the setup stage, or after a task completion or confirmation stage. A workflow may comprise a number of states through which the automation proceeds in order to accomplish the ultimate ends of the workflow. For example, the automated workflow may proceed from one state to the next, and completion of the workflow may depend on advancing through each of the states defined in the workflow. A workflow manager may supervise and control the advancement from one state to the next based on instructions associated with the workflow being performed. For example, the workflow manager may execute commands specified in the instructions to advance the workflow from one state to the next, and the progression to the last state in the workflow may represent the completion of the workflow and the achievement of the workflow's objective(s).

However, during certain automation, the workflow may be interrupted. Furthermore, certain interruptions may require user input or interaction to proceed to the next state in the workflow and, by extension, to complete the automated workflow. In examples, the interruption is a "CAPT-CHA" or a "Completely Automated Public Turing test to tell Computers and Humans Apart." A CAPTCHA often requires user input or interaction to, as the name indicates, tell computers and humans apart. Thus, when an automated workflow is interrupted by a CAPTCHA or other similar interruption, the automated workflow may not be able to proceed until the appropriate user input or interaction has occurred. Moreover, even in instances where the automated workflow may be capable of overcoming or otherwise bypassing the CAPTCHA without user input or interaction, it may be desirable not to do so for a variety of reasons.

Accordingly, aspects of the present disclosure relate to detecting an interruption that requires user intervention, such as a CAPTCHA, during an automated workflow. Upon detecting an interruption, the automated workflow may be paused and the interruption presented such that a user may provide the appropriate input or interaction to allow the workflow to proceed. In examples, detecting an interruption involves evaluating the structure, appearance, or other attributes of the resource(s) with which the automated workflow is interacting (e.g., by submitting commands, inputting or requesting data, interacting with APIs, etc.). For instance, the actions associated with an automated workflow may involve interacting with one or more web sites. In such an instance, interruption detection may involve evaluating the structure, appearance, or other attributes of the web site to determine whether an interruption has occurred.

In examples, evaluating the structure, appearance, or other attributes of a resource involves using a Document Object Model (DOM) of the target resource. As will be appreciated, a DOM may be a data structure representing the user interface, such as data defining the structure of documents. As used herein, a document may an HTML web page, XML data, or any other similar content. As an example, the HTML of a web page located on a network may be defined using the DOM. In other examples, the term document may refer to the user interface of a native application. In examples, the DOM may define the structure of a resource using an accessibility tree or window hierarchy of elements for a native application, such as an application running on a Windows® or Android® operating system. The DOM of a target resource may be extracted or otherwise determined by a DOM engine, as will be discussed in greater detail in connection with FIG. 1, below. In examples, a DOM engine may comprise an Accessibility Listener, such as when the DOM engine determines the structure of an application using an accessibility tree or window hierarchy. I The DOM of such a web page may be extracted and evaluated to detect whether an interruption has occurred or is likely occur according to aspects of the present disclosure. For example, interruptions may be likely to appear within certain elements of the DOM of a resource. As one example, interruptions may be likely to appear within an iframe of a web page's HTML. Furthermore, interruptions appearing within an iframe of a web page's HTML may be likely to contain certain markup language, such as language containing the term "captcha" or another variant thereof. In another example interruptions may be likely to appear within a view, activity, or window of an accessibility hierarchy or window hierarchy. In such an example, interruptions within the view, activity, or window may have characteristics that further indicate the presence of an interruption. Thus, using the DOM of the target resource, it may be possible to examine the DOM for elements, features, or other characteristics that may indicate that an interruption has occurred, such as an iframe with markup containing the term "captcha."

In other examples, evaluating the structure, appearance, or other attributes of a resource involves using computer vision. As will be appreciated, computer vision may refer broadly to the set of techniques used to acquire, process, understand, or otherwise analyze digital images or other visual data. As an example, computer vision techniques may be utilized to process the appearance of a web page as it appears to a user accessing that web page (e.g., by using a web browser). In such an example, the computer vision techniques may acquire data relating to the organization and attributes of the visual features or elements that comprise the web page in question.

As an example, this visual data may be represented or processed in a number of ways, such as, for example, by using thresholding to represent the color properties of each pixel on a given web page. Additionally or alternatively, computer vision techniques may allow for the representation and/or understanding of a resource by identifying visual features or elements of the resource. For example, a visual feature or element of a given resource might include an image or logo in a portion of the resource.

These and/or or other similar computer vision techniques may be used to evaluate the structure, appearance, or other attributes of a resource to detect whether an interruption has occurred during an automated workflow. For example, data may be collected over time relating to the visual appearance of interruptions. This data may be used for examining the attributes of a resource to determine whether an interruption has occurred.

For instance, visual features of a resource may be identified and/or extracted using computer vision techniques. These visual features may be compared to the data relating to prior interruptions to determine whether, and if so to what extent, the visual features resemble or are otherwise similar to the visual features associated with prior interruptions. Using computer vision techniques, it may be possible to generate a score or other similar representation of the degree of similarity between the visual features of a resource and the visual features of prior interruptions.

In this way, the accumulation and maintenance of data from prior interruptions may enable more accurate detection or prediction of future interruptions. To that end, the systems and methods herein may use feedback mechanisms to improve the detection of interruptions. In examples, an interruption is not predicted or detected but nonetheless occurs. The interruption may, for instance, be a new type of interruption not previously detected and, therefore, sufficient data relating to the interruption may not exist to enable accurate detection/prediction. Upon the occurrence of the new interruption, the system may examine and extract data relating to the structure, appearance, or other attributes of the circumstances in which the interruption occurred. This data may enable the system to update and improve its detection/prediction capabilities such that the next time the interruption appears in workflow, the system will identify the attributes of the interruption and react accordingly.

As data is collected relating to the different types of interruptions and the various attributes related thereto, it may be possible during interruption detection/prediction to not only detect or predict whether an interruption has occurred or will occur, but to also detect or predict the type of interruption that has occurred or will occur. For example, in the example described above relating to using the DOM of a resource to detect an interruption, data may indicate that certain attributes in the DOM indicate a first type of interruption while certain other attributes indicate a different, second type of interruption. Thus, when the attributes of the DOM are extracted and examined, the attributes may indicate not only that an interruption has occurred but also that a specific type of interruption has occurred. Likewise, in the example described above relating to using computer vision, certain visual features or pixel intensities may be associated with particular types of interruptions, such that the computer vision examination enables detection of the type of interruption that has occurred.

In examples, multiple interruption detection techniques may be used in series and/or in parallel when performing interruption detection during a workflow. For instance, the DOM techniques and computer vision techniques may be used in combination, which may improve the accuracy and/or confidence of interruption detection/prediction. As will be appreciated, there are a number of ways in which techniques can be used in combination during a workflow. In one example, multiple techniques may be used substantially simultaneously and, if any one of the multiple techniques indicates that an interruption has occurred, the workflow may react accordingly by, for example, pausing the workflow for user input.

In other examples, the multiple techniques may be used in series, with a first technique being utilized first and a second technique being performed subsequently if the first technique produces a particular outcome. For example, the second technique may be utilized when the first technique produces an inconclusive or uncertain result regarding whether an interruption has occurred. Or, in another example, the second technique may be utilized when the first technique indicates that an interruption has occurred, in which case the second technique may be utilized to confirm that the determination of the first technique is accurate. The order in which the multiple techniques is performed may be based on any number of factors, including, for example, the processing resources required by each of the techniques and the accuracy of the techniques, which could encompass the rate of false positives and/or false negatives produced by the techniques.

In examples, utilization of the interruption-detection techniques may produce a numerical representation of the likelihood that an interruption has occurred, such as a "score" or a "confidence value." In some examples, each technique utilized may produce its own respective score indicating, based on its examination of the resource attributes, the likelihood that an interruption has occurred or will occur. These scores may be used to determine the appropriate action(s) to take in response to the detection of a potential interruption. For instance, thresholds may be used to dictate the appropriate course of action for different ranges of scores generated by the utilized technique(s). If the score is above a certain threshold, the workflow may be paused and the user presented with and/or notified about the interruption so that the user can provide the appropriate input to resolve the interruption. If the score is below a threshold, the workflow may not be paused and the user not notified.

In examples, scores generated by the interruption-detection techniques may be used to determine whether to utilize additional and/or different techniques. For instance, if a score generated is above a lower threshold but below a higher threshold, it may be determined that the result of the first technique is inconclusive and, as a result, that it would be beneficial to utilize an additional technique. In such an instance, the second technique may be utilized and a second score generated. This second score may be added to, averaged with, or otherwise used in conjunction with the first score generated by the first technique. When used in conjunction, the first and second scores may improve what was originally an inconclusive or uncertain detection/prediction by, for example, confirming that an interruption has or has not occurred.

By enabling detection of an interruption during an automated workflow, it may be possible to improve the workflow by avoiding a scenario in which an interruption prevents or unduly delays the completion of the workflow. However, detecting interruptions may demand processing, memory, power, or other resources that may deteriorate performance by, for example, slowing down the workflow. Thus, in examples, interruption detection may be performed in certain circumstances in which an interruption is likely to occur while not being performed in other circumstances in which an interruption is unlikely to occur. Thus, in addition to using the above-described techniques to detect whether an interruption has occurred, the same or similar techniques may be used to monitor and evaluate the states of a workflow to identify the circumstances in which an interruption is likely to occur. When such a circumstance is identified, the techniques described herein may be utilized to determine whether such an interruption has occurred.

FIG. 1 illustrates an overview of an example system 100 for an automated workflow according to aspects described herein. As illustrated, system 100 includes computing device 102, automation target 104, data store 106, and network 110. As illustrated, computing device 102, automation target 104, and data store 106 communicate via network 110, which may comprise a local area network, a wireless network, the Internet, or any combination thereof, among other examples.

While system 100 is illustrated in an example where computing device 102 may communicate with automation target 104 and data store 106 via network 110, it will be appreciated that, in other examples, these elements may be directly connected to a computing device, for example using a wired (e.g., universal serial bus (USB) or other electrical connection) and/or wireless (e.g., Bluetooth Low Energy (BTLE) or Wi-Fi Direct) connection. Alternatively, the various elements depicted in FIG. 1 may reside on a single device. Elements 102-106 may each be any of a variety of devices, including, but not limited to, a mobile computing device, a tablet computing device, a laptop computing device, a desktop computing device, an IoT (or "smart") computing device, or a server computing device, among other examples.

Computing device 102 includes workflow manager 112 and interruption detection engine 114. In examples, workflow manager generates, implements, and/or tracks actions associated with an automated workflow. For instance, workflow manager may receive a command to perform a task, such as, for example, changing a user's login credentials associated with an online resource (e.g., a website). Workflow manager 112, in response to receiving this command, may access a set of instructions associated with a workflow for changing the login credentials in question. The set of instructions may, for example, identify an ordered series of actions that can be performed to change the login credentials. This ordered series of actions may be referred to herein as a "workflow," and the workflow may further be defined with reference to a plurality of "workflow states" through which the workflow manager may advance to complete the designated workflow.

Workflow manager 112, to commence the automated workflow, may access this set of instructions from memory of computing device 102, may request this set of instructions from a remote memory via network 110, or a combination thereof. Additionally, or alternatively, workflow manager 112 may itself generate a set of instructions in response to receiving a request to perform a task. For example, workflow manager 112 may be unable to access or retrieve a previously prepared set of instructions associated with a task, in which case workflow manager 112 may be able to generate such a set of instructions based on information regarding the requested task. For instance, in the example provided above of a request for a change to a user's login credentials, workflow manager 112 may identify a URL associated with the login credentials and determine commands to submit to the URL based, for example, on a set of instructions for accomplishing a similar task for a different website.

Workflow manager 112 may additionally manage the implementation/execution of the workflow. For example, after a set of instructions has been identified or generated, workflow manager 112 supervises the execution of the instructions by performing the appropriate series of actions associated with the instructions. Such actions may include providing inputs, submitting commands, or otherwise interacting with a resource until the series of actions has been completed. Workflow manager 112 may supervise the performance of these actions by, among other things, monitoring which actions have been performed and ensuring that the actions are performed in the appropriate order and at the appropriate time according to the set of automation instructions.

In implementing the workflow, workflow manager 112 may interact with an automation target, such as automation target 104. An automation target may by any resource with which workflow manager 112 interacts to execute a workflow. Automation target 104 may be, for example, a web site, a database, an application, a process, any combination thereof, etc. Although system 100 depicts a single automation target 104, it will be appreciated that execution of a workflow may require interaction with a number of automation targets, which may be located within the same network, on the same server, or on the same device or may be located remote from one another on separate networks, servers, or devices.

As depicted, automation target 104 includes a plurality of workflow states 124-128, including state 1 124, state 2 126, and state N 128. Any workflow may comprise any number of states through which workflow manager 112 may proceed to complete the workflow. To proceed from one state to the next, workflow manager 112 submits commands, input, or otherwise interacts with automation target 104. For example, in the illustrative case of a workflow for changing a user's login credentials, automation target 104 may be the website associated with the login credentials. State 1 124 may be a web page of the web site on which a user may submit a request to change the credentials. Submission of such a request by workflow manager 112 may result in advancing to state 2 126, which may be a web page on which login credentials may be changed upon submission of both the current and the newly desired login credentials. Submission of these inputs by workflow manager 112 may result in the workflow advancing to a state 3 (not depicted). However, state 3 may include an interruption, and user interaction may be required to proceed to the next workflow state and complete the workflow.

Computing device 102 further comprises interruption detection engine 114 which may operate in conjunction with workflow manager 112 to detect such an interruption. For example, interruption detection engine 114 may monitor the progress of workflow manager 112, such as by receiving indications from workflow manager 112 relating to the states of a workflow and the workflow manager's 112 advancement therethrough. For instance, interruption detection engine 114 may, either based on information received from workflow manager 112 or from information communicated by automation target 104 via network 110, determine that the workflow has advanced from one state to another.

In the example described above, interruption detection engine 114 may detect that the workflow for changing login credentials has advanced from state 2—in which the old and new login credentials were input—to state 3. Upon detecting the change from one state to the next, interruption detection engine 114 may receive—again, from either workflow manager 112 or via network 110 from automation target 104—information relating to the new state 3. This information may include, for example, information relating to the structure, appearance, or other attributes of state 3.

Interruption detection engine may examine the received attributes of state 3 to determine whether an interruption has occurred. As depicted in illustrative FIG. 1, interruption detection engine 114 includes computer vision engine 116 and DOM engine 118. The attributes of state 3 may include the DOM of state 3. Using this information, DOM engine 118 may determine whether an interruption has occurred, continuing with the above example, at state 3 of the workflow. For example, DOM engine 118 may identify an element in the DOM of state 3 that is indicative of a required user interaction, thereby interrupting the workflow. Additionally or alternatively, computer vision engine 116 may identify visual features indicative of an interruption having occurred. The techniques and operations performed by interruption detection engine 114, DOM engine 118, and computer vision engine 116 are described in greater detail herein in connection with FIGS. 2-6.

The techniques and operations performed by interruption detection engine 114 may involve accessing and/or analyzing data relating to prior interruptions detected during automated workflows. To that end, system 100 may include data store 106, which, as depicted, includes workflow state data 120 and interruption detection data 122. Workflow state data 120 may include instructions, actions, commands, or other information associated with the performance of one or more workflows. Workflow manager 112 and/or interruption detection engine 114 may access workflow state data 120 to determine the actions to be performed in connection with an automated workflow.

Interruption detection engine 114 may access interruption detection data 122 to determine whether an interruption has occurred at one or more states of a workflow being performed by workflow manager 112. Interruption detection data may include, for example, data relating to the structure, appearance, or other attributes of automation target 104 during procession of workflow manager 112 through the states 124-128 of a workflow. For instance, interruption detection data may include entries describing the appearance of the states at which interruptions have previously occurred, including the visual features of those states that were present upon the occurrence of those previous interruptions. In examples interruption detection data 122 further includes entries describing the DOM of the states at which interruptions have previously occurred, including the DOM elements and attributes present upon the occurrence of those previous interruptions and/or DOM elements and attributes that indicate user interaction requirements.

Thus, as described herein, interruption detection engine 114 may use this exemplary data or other similar data when determining whether an interruption has occurred during a workflow being performed by workflow manager 112. Moreover, interruption detection engine 114 may generate additional interruption detection data 122 based on the performance of its interruption detection techniques. For instance, when interruption detection engine 114 detects an interruption during a workflow, the attributes used to determine the presence of the interruption may be sent to data store for addition to interruption detection data 122.

While data store 106 is depicted in FIG. 1 as a peripheral data store and workflow manager 112 and interruption detection engine 114 are depicted as modules or components of computing device, such that workflow manager 112, interruption detection engine 114, and data store 106 may communicate via network 110, it will be appreciated that these elements may be located in a single location or on a single device such that communication via network 110 is not necessary for retrieval and processing of data.

Figure 2:
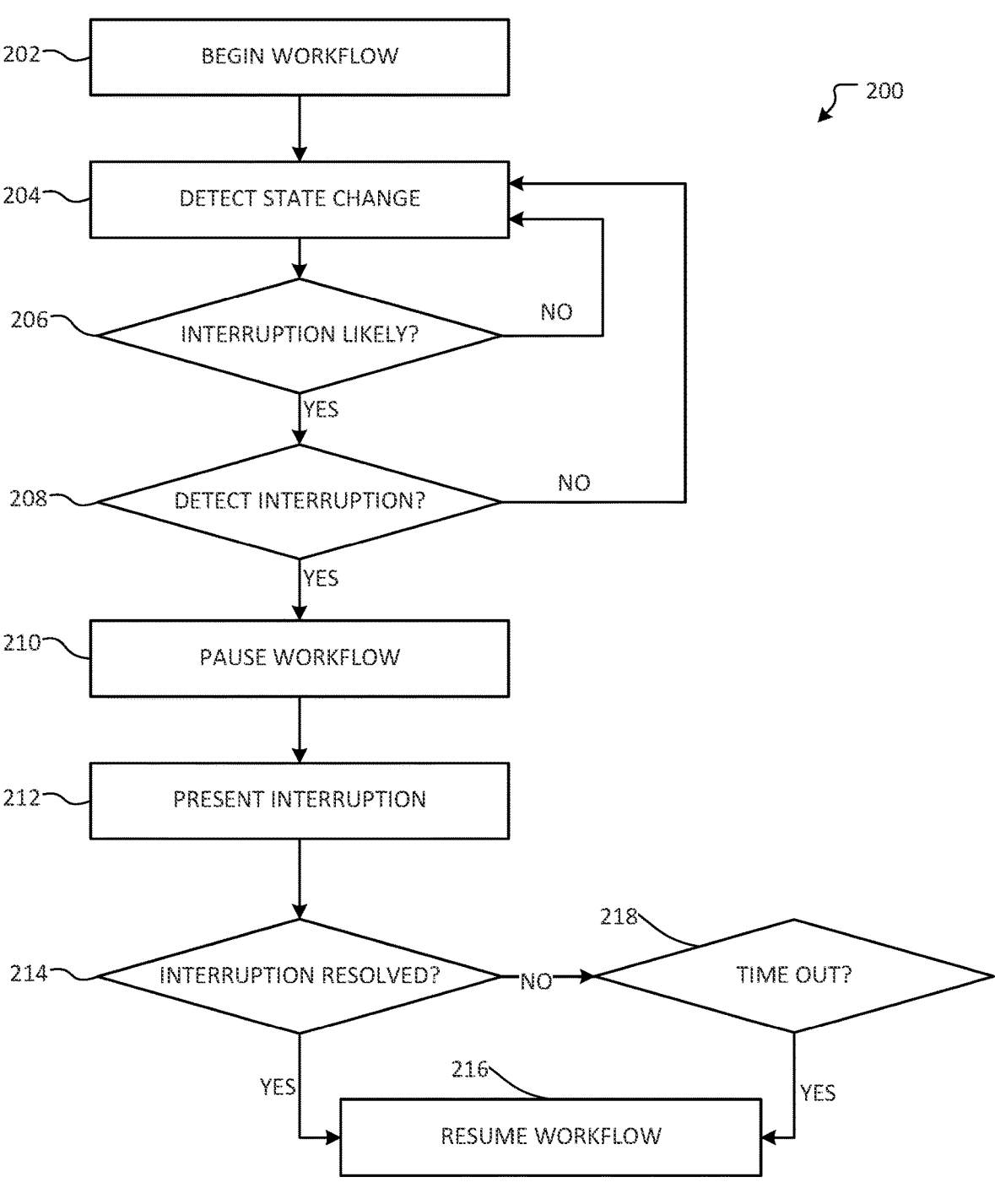
FIG. 2 illustrates an overview of an example method for detecting an interruption during an automated workflow.

FIG. 2 illustrates an overview of an example method 200 for detecting an interruption during an automated workflow. In examples, aspects of method 200 are performed by a device, such as computing device 102, data store 106, or automation target 104 discussed above with respect to FIG. 1.

Method 200 begins at operation 202, where an automated workflow begins. An automated workflow may begin in response to receiving an instruction (e.g., from a user, application, process, etc.) to perform a certain workflow or task. In other examples, an automated workflow may be performed on a schedule, and the workflow may begin in response to an amount of time having elapsed since the last execution of the workflow. In still other examples, an automated workflow may begin in response to the occurrence of some other condition, such as an automated workflow that has been programmed to occur in response to a user performing another related activity.

Operation 202 may be performed, for example, by a workflow manager, such as workflow manager 112 of FIG. 1. Beginning an automated workflow may include retrieving or generating a set of instructions associated with the automated workflow and beginning the execution of the automated workflow by initiating the first of a series of one or more workflow actions for performing the workflow. In examples, beginning an automated workflow comprises sending a command or other input to an automation target resource, such as a web site, database, or the like. Beginning an automated workflow may further include beginning the supervision and/or monitoring of the workflow.

At operation 204, a change of workflow states is detected. An automated workflow may comprise a series of one or more workflow actions for proceeding between one or more associated workflow states. Operation 204 may be performed by a workflow manager that is supervising or otherwise monitoring the performance of an automated workflow by, among other things, tracking the progress of the automated workflow from one workflow state to the next. Detecting a change in workflow states may involve, for example, receiving from an automation target resource a response to a command or other input to the automation target by the workflow manager. In other examples, a response may not be received from an automation target but the workflow manager may detect a change in workflow states by monitoring the structure, appearance, or other attributes of the target. For example, the workflow manager may detect that the user interface or URL of the target changed, indicating that the workflow has progressed from one state at the first user interface view or first URL to a different state at a second, different URL or a second user interface view.

At determination 206, it is determined whether an interruption is likely or has occurred. In examples, it can be determined whether an interruption is likely by examining the path of the workflow being performed. For example, consider a workflow comprising 8 workflow states for which it has just been detected that the workflow has changed from the fifth state to the sixth. To determine whether an interruption is likely, the first five states of the workflow may be examined. Based on this examination, it may be determined that an interruption is likely to occur at the sixth state of the workflow. For example, data relating to the past performance of the same or a related workflow may be accessed and analyzed to determine that during the performance of the automated workflow, an interruption occurs at the sixth workflow state over 80% of the time. Thus, it may be determined that a workflow interruption is likely to occur at the sixth workflow state during this performance of the workflow.

Conversely, it may be determined that an interruption rarely or never occurs at the sixth state of the workflow, in which case it can be determined that a workflow interruption is unlikely to occur during this performance of the workflow. In such an instance, determination 206 would be "NO," and the method may return to operation 204 to continue to monitor the automated workflow and detect when the workflow has proceeded to a new state (e.g., the seventh state of the previously described example). It will be appreciated that by determining whether an interruption is likely to occur before attempting to determine whether an interruption has occurred may preserve time, save processing resources, or otherwise prove advantageous because it may provide minimal benefit to attempt to determine whether an interruption has occurred at a state at which an interruption is very unlikely to occur.

It will also be appreciated, though, that determination 206, like the rest of the operations and determinations of method 200, is optional and described for illustrative purposes only. Thus, upon detection of a state change at operation 204, the method may proceed to determination 208 without first determining the likelihood that an interruption will occur. In such an example, determination 208 may be made whenever a state change is detected. In other examples, determination 206 may indicate that an interruption is not likely, but the method may nonetheless proceed to determination 208 to determine whether an interruption has been identified. In such an example, a numerical representation of the likelihood of an interrupt (e.g., a percentage likelihood) may be generated at determination 206, and the determination of whether to proceed to determination 208 or return to operation 204 may depend on the magnitude of this numerical representation. For instance, thresholds may be used to determine whether the method proceeds to determination 208, returns to operation 204, or proceeds in some other manner entirely.

At determination 208, it is determined whether an interruption has been detected. Determination 208 may, for example, be performed wholly or partially by interruption detection engine 114 of FIG. 1. In examples, determination 208 involves examination of the structure, appearance, or other attributes of the workflow state. Such examination may include utilization of DOM analysis, computer vision analysis, or some combination thereof. In such examples, determination 208 may be performed by interruption detection engine 114, DOM engine 118, computer vision engine 116, or any combination thereof. The operations and analysis performed at determination 208 are discussed in greater detail in connection with FIGS. 3-4 herein.

In examples, determination 208 is performed by DOM engine 118, which extracts the DOM of an automation target (and/or a specific state of an automation target during an automated workflow), identifies one or more elements of the DOM that may be indicative of an interrupt having occurred, examines one or more attributes associated with the element (s) of the DOM to determine that an interruption has occurred.

In examples, determination 208 may be performed by computer vision engine 116, which identifies one or more visual features or attributes of an automation target (and/or a specific state of an automation target during an automated workflow), compares the visual feature(s) to visual features previously identified in connection with a workflow interruption, and determines that an interruption has occurred based on a similarity between the visual feature(s) of the automation target and the visual feature(s) of a prior workflow interruption. In examples, the visual features identified be computer vision engine 116 at determination 208 may be pixel intensities of an automation target (and/or a specific state of an automation target during an automated workflow). In other examples, the visual features of the prior workflow interruption may be a template of a workflow interruption or components thereof.

In still other examples, determination 208 may be performed by a combination of DOM engine 118 and computer vision engine 116. For instance, each of DOM engine 118 and computer vision engine 116 may be used in a hybrid approach that utilizes one or more interruption detection techniques. The utilization of more than one technique may, for example, be situation-dependent such that the determination of whether to use multiple technique and, if so, which techniques to use depends on whether a first technique generates a strong indication of an interruption. An example of such a hybrid technique is described in greater detail in connection with FIG. 5 herein.

If determination 208 determines that an interruption has not occurred (i.e., "NO"), method 200 may proceed to operation 204, and the workflow may proceed until a new workflow state is detected. It will be appreciated, though, that determination 208 may have less than perfect accuracy in determining whether an interruption has occurred, and the determination may be "NO" even in some instances when an interruption has occurred. For example, the interruption may be a type of interruption not previously encountered, which may contribute to the inability to inaccurately detect that the interruption has occurred. In such examples, method 200 may attempt to return to operation 204 to detect when the workflow state has changed, but the workflow may not proceed to a next state because an interruption has occurred.

If the workflow cannot progress to the next workflow state due to an undetected interruption, method 200 may further include a step (not pictured) at which an indication of workflow incompletion is received. Such an indication may indicate a required user input, a time out of a workflow state, or the like. If determination 208 determined that an interruption had not occurred but an indication of workflow incompletion is subsequently received, the states of the workflow may be examined to extract attributes of the workflow and/or the workflow states, which may be added to a database of workflow data (e.g., interruption detection data 122) to improve the accuracy of future interruption detection.

If determination determines that an interruption has occurred (i.e., "YES"), the flow proceeds to operation 210, and the workflow is paused. Operation 210 may be performed by a workflow manager, such as workflow manager 112, and/or an interruption detection engine, such as interruption detection engine 114. For example, upon detecting that an interruption has occurred, interruption detection engine 114 may notify workflow manager 112 of the interruption. Workflow manager 112 may pause the automated workflow by sending/receiving a code or command that prevents the workflow manager 112 from attempting to proceed to the next workflow state (e.g., by wrapping the function responsible for requesting a new state). It will be appreciated, though, that there are a number of techniques that may be used to pause the automated workflow, and operation 210 could be performed using any of these techniques.

At operation 212, the interruption is presented. In examples, presenting the interruption includes displaying the interruption on a screen of a user device, playing an audio sound or message, providing a tactile notification, or any combination thereof. Because user input or interaction may be required to resolve the interruption, the specific techniques used to present the interruption may be any such techniques that may effectively alert a user that an interruption has occurred and/or the specific steps that a user must take to resolve the interruption and resume the automated workflow. In some instances, an automated workflow may be being performed in the background on a device while a user performs other tasks on the device. In such an instance, presenting an interruption may involve providing the user with an alert that an interruption has occurred and providing the user with a button, link, or other means for navigating from the user's current task to the automated workflow state that has experienced the interruption.

At determination 214, it is determined whether the interruption has been resolved. For example, for an interruption that requires a user input to resolve the interruption, determination 214 may involve determining whether a user input has been received and, if so, whether it was a user input sufficient to resolve the interruption. For example, an interruption that is a CAPTCHA may be detected based on the structure, appearance, or other attributes of an automation state indicating the presence of a CAPTCHA. Based on detecting the CAPTCHA, the workflow may be paused and the CAPTCHA presented (e.g., by displaying it on a user device). In such an example, determination 214 may involve determining whether a user has successfully completed the CAPTCHA such that the automated workflow may resume.

In examples, determining whether the interruption has been resolved may include evaluating attributes of an automation target (and/or a specific state of an automation target during an automated workflow) to determine whether a detected interruption is still present. In the CAPTCHA example, such an evaluation may include performing DOM, computer vision, or other analysis to determine whether the attributes that led to the detection of the interruption are still present. For instance, if the CAPTCHA was detected based on the DOM including an iframe with markup containing "captcha," the DOM may be examined again to determine whether an iframe is still present on the state and/or whether "captcha" appears in the markup. In examples where the CAPTCHA was detected based on a DOM including a window, view, or activity in an accessibility hierarchy, the DOM may be examined again to determine whether the window, view, or activity is still present. In other examples, if the CAPTCHA was detected based on visual features indicative of an interruption appearing on the workflow state, determining whether the interruption has been resolved may be accomplished by determining whether those visual features are still present.

In other examples, determining whether the interruption has been resolved may include receiving user input. For instance, in conjunction with presenting the interruption, a user may be provided with means for indicating that the interruption has been resolved. For example, the user may be provided with a prompt asking whether the user has resolved the interruption. In the CAPTCHA example, the prompt could, for example, ask the user whether the user successfully completed the CAPTCHA, thus resolving the interruption. If a user input is received indicating successful resolution of the interruption, it may be determined that the interruption has been resolved.

If it is determined that the interruption has been resolved, flow proceeds to operation 216, and the automated workflow is resumed. Resuming the automated workflow may involve providing a command or input to the workflow manager indicating successful resolution of the interruption and, in response, the workflow manager removing any obstacles or restraints previously placed on the workflow execution at operation 210 when the workflow was paused (e.g., by calling a function to resume the workflow by attempting to proceed to the next workflow state). Operation 216 may involve returning to operation 204, where change of state is detected and interruption detection continually performed until completion of the workflow.

If it is not determined at determination 214 that the interruption has been resolved (e.g., because a user input indicating resolution is not received or because DOM/computer vision analysis indicates the continued presence of an interruption), flow proceeds to determination 218, where it is determined whether a time out has occurred. In some cases, a workflow may be paused and an interruption presented but the necessary user input never received. For instance, a user may be busy, distracted, or otherwise unable or unwilling to resolve an interruption. In other instances, though, an interruption may be successfully resolved but determination 214 may nonetheless be unable to accurately determine as much. For example, a user may resolve a CAPTCHA and be presented with a prompt to indicate successful resolution but for any number of reasons may fail to fulfill the prompt. Thus, the interruption may have been successfully resolved but determination 214 may not have determined as much.

If a time out has occurred at determination 218—because the interruption has not been successfully resolved, because the resolution was not accurately detected, or any other reason—flow may proceed to operation 216, where an attempt may be made to resume the workflow. If the interruption has not been resolved, attempting to resume the workflow may be unsuccessful, and the workflow may terminate. However, if the interruption has been resolved, the workflow may resume by proceeding to the next workflow state until completion of the workflow or until a new interruption is detected.

Figure 3:
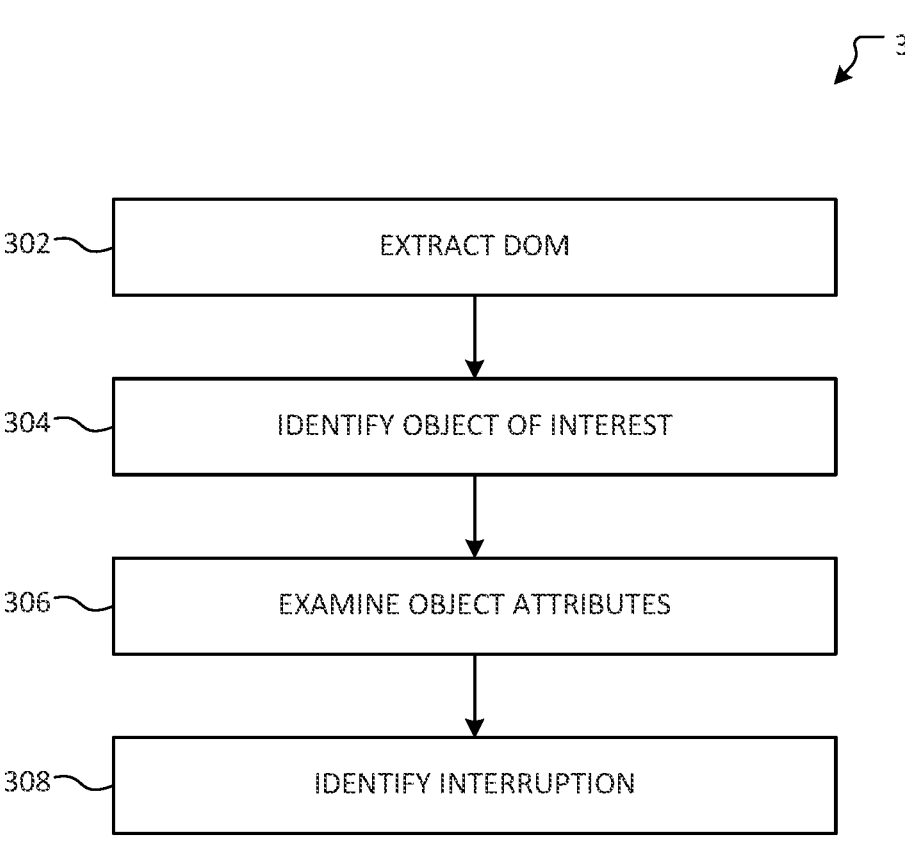
FIG. 3 illustrates an overview of an example method for detecting an interruption during an automated workflow using DOM.

FIG. 3 illustrates an overview of an example method 300 for detecting an interruption during an automated workflow using DOM. As described herein, DOM refers to a Document Object Model. The workflow states of any automation target (e.g., automation target 104) may include a DOM or other similar model describing or defining the structure of the user interface, webpage, etc. that is presented during a particular workflow state. For instance, in a workflow state that is an HTML webpage, the HTML structure and content of the page may be represented or defined by a DOM. The DOM of any workflow state may be used to determine whether an interruption has occurred during an automated workflow.

At operation 302, the DOM is extracted. In accordance with aspects herein, the DOM may be extracted from a workflow state of an automation target. Each workflow state in a workflow may have its own DOM defining or describing the structure and/or content of the state. It will be appreciated that the DOM of a workflow state may be extracted or otherwise determined for DOM analysis.

At operation 304, an object of interest is identified. In examples the object of interest is an element or object in a workflow state's DOM that is indicative of a workflow interruption. Identification of the object of interest may be based, among other things, on data relating to one or more prior workflow interruptions. Such data may be stored, for example, as part of interruption detection data 122 in data store 106 of system 100. Such data may have been collected and compiled over time during prior automated workflows. For example, during prior automated workflows in which an interruption was experienced, the DOM of the state on which the interruption occurred may have been extracted and stored. Over time, as the DOM of states on which an interruption occurred may be accumulated such that the compiled DOM data may reveal commonalities between the DOM of the interruptions.

In an example where the interruption is a CAPTCHA, it may be determined based on accumulated data that when a CAPTCHA appears in a workflow state, it commonly appears within an HTML iframe. Thus, at operation 304, identifying an object of interest may include examining the DOM to identify any iframes. It will be appreciated, however, that an interruption may occur in any number of structures of a DOM, and an iframe is only one illustrative example. In other examples, an interruption may occur in a view, window, or activity of an accessibility hierarchy, such that identifying a DOM including such a view, window, or activity is indicative of an interruption having occurred. In another example, a link to a CAPTCHA site or other type of user verification may be present in the DOM.

At operation 304, the attributes of the object of interest are examined. As used herein, the attributes of the object may broadly encompass any number of aspects of the object, such as the location of the object, the structure of the elements surrounding the object, the content with which the object is associated, any combination thereof, or any other attribute relating to what, where, or how the object appears in the workflow state. Certain attributes of the object, however, may be more important than others for the purposes of determining whether the object is indicative of (or is itself) a workflow interruption. For example, the data relating to one or more prior workflow interruptions may be used to determine which attributes are indicative of an interruption.

In the CAPTCHA example, data may indicate that one attribute that may be indicative of an interruption is the markup associated with the identified iframe. For instance, it may be determined that an iframe with markup containing certain keywords, keyphrases, or other attributes may be strongly predictive of an interruption having occurred. Thus, operation 306 may involve examining the markup of the iframe to determine whether such keywords are present. In examples, a keyword indicative of an interruption having occurred may be "captcha" or a variant thereof. Similarly, a link to a CAPTCHA cite is present in the DOM may be indicative of an interruption requiring user interaction.

At operation 308, an interruption is identified. Identifying an interruption may involve determining that an object of interest is present in the DOM of a workflow state and that the object of interest has certain attributes indicative of an interruption having occurred. In that case, operation 308 may involve identifying the object that is indicative of or is itself an interruption and alerting the workflow manager of the presence and/or location of the interruption. In examples, identifying an interruption involves generating a numerical value representing the likelihood that an interruption has occurred. For instance, the DOM analysis may indicate a possibility that an interruption has occurred but an element of uncertainty may remain. Thus, operation 308 may involve quantifying that uncertainty, such as by generating a probability that the DOM analysis is indicative of an interruption having occurred.

In the CAPTCHA example, operation 308 may involve determining that the DOM includes an iframe, examining the markup of the iframe, determining that the markup includes a keyword, and identifying the iframe as likely containing a workflow interruption, etc. Operation 308 may further involve accessing interruption detection data and determining that the keyword of the iframe markup is indicative of a CAPTCHA 80% of the time. Thus, operation 308 may involve generating a score or other indication of the probability of a CAPTCHA interruption having occurred based on the DOM analysis and comparison to data relating to prior workflow interruptions. If the score meets a set threshold value, an interruption may be identified at operation 308.

Figure 4:
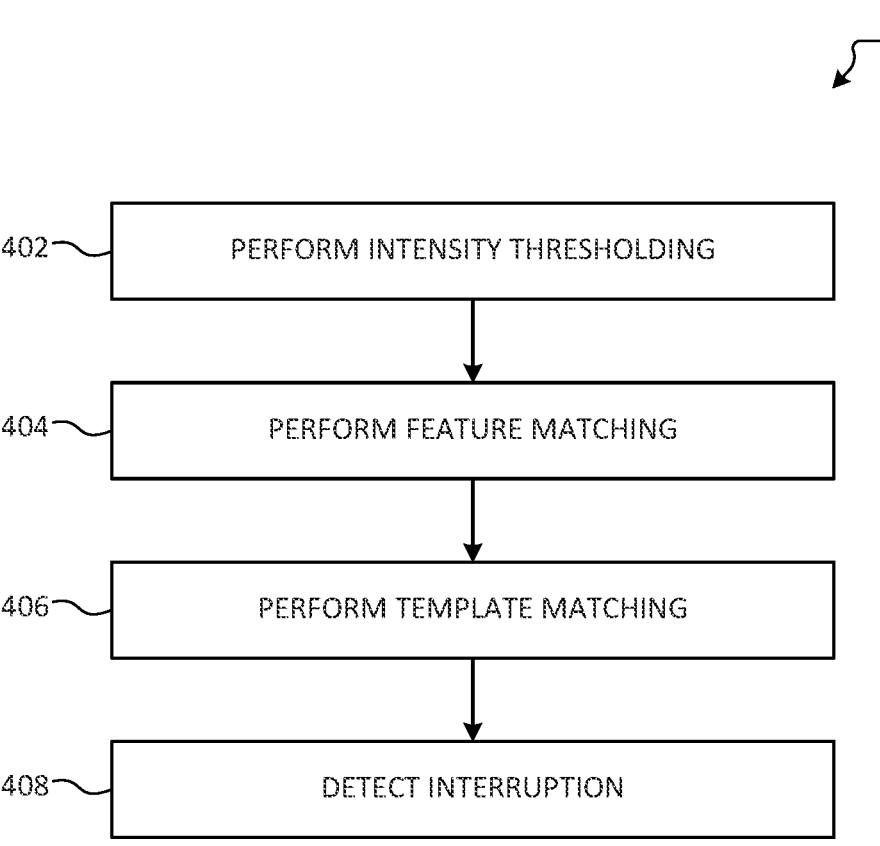
FIG. 4 illustrates an overview of an example method for detecting an interruption during an automated workflow using computer vision.

FIG. 4 illustrates an overview of an example method 400 for detecting an interruption during an automated workflow using computer vision. As described herein, computer vision may include or refer to a set of techniques used to acquire, process, understand, or otherwise analyze digital images or other visual data. As an example, computer vision techniques may be utilized to process the appearance of a web page as it appears to a user accessing that web page (e.g., by using a web browser). In such an example, the computer vision techniques may acquire data relating to the organization and attributes of the visual features or elements that comprise the web page in question.

In example method 400, a combination of computer vision techniques are disclosed, including techniques relating to intensity thresholding, feature matching, and template matching. It will be appreciated that these techniques are provided as examples of ways in which computer vision may be utilized to detect a workflow interruption and that there are other computer vision techniques that may be utilized to the same or similar effect. Furthermore, although example method 400 is depicted as including the performance of each of the aforementioned computer vision techniques, it will be appreciated that any one or more of these techniques, alone or in combination and in any order, may be used to detect an interruption using computer vision.

For example, as described in greater detail in connection with FIG. 5, the performance of multiple interruption detection techniques may be based on the results of the analysis, such that the selection of techniques to perform and/or the order in which they are performed may be situation-dependent. In such an example, a first technique may be utilized and if the first technique generates a sufficiently confident determination that an interruption has or has not occurred, it may be understood that a second technique need not be utilized and the result of the first technique may alone be sufficient for determining whether an interruption has occurred.

At operation 402, intensity thresholding is performed. In examples, intensity thresholding is performed by a computer vision engine of an interruption detection engine, such as computer vision engine 116 of interruption detection engine 114. Performing intensity thresholding may involve extracting, calculating, or otherwise identifying the pixel intensities of an interface of a workflow state. In an example where a workflow target is a native mobile application and the workflow state is a display screen within that application, the pixel intensities may refer to the visual appearance of the application on the display screen. Pixel intensities may be represented as a collection of values, including for example in a table, in vector space, in bitmap format, or in any other appropriate format for representing the pixels of a user interface presented during a particular workflow state.

Intensity thresholding may further involve evaluation of the identified pixel intensities to determine whether an interruption has occurred. For example, there may be similarities in the pixel intensities of common workflow interruptions, such that examination of the pixel intensities of a workflow state allows for a determination of whether an interruption has occurred. In examples, data relating to the pixel intensities of prior workflow interruptions may be accessible, such as by including the data in workflow interruption data (e.g., interruption detection data 122).

In examples, the pixel intensities of a present workflow state may be compared to the pixel intensities of prior workflow states, including prior workflow states at which an interruption occurred. Based on the comparison, it may be determined that an interruption has occurred, that an interruption has not occurred, or that there is a certain likelihood that an interruption has occurred. For instance, the comparison may be used to generate a numerical representation of the probability that the present workflow state contains an interruption, such as a confidence value or probability score. Such a determination may be provided, for example, to an interruption detection engine and/or workflow manager to aid in the determination of whether an interruption has occurred and whether to pause an automated workflow for presentation of the interruption.

It will be appreciated that performing intensity thresholding may provide advantages in determining whether an interruption has occurred. For example, intensity thresholding may be a strong predictor of interruptions in controlled environments in which there is consistency between the appearance of interruptions. One such example may be the detection of CAPTCHA interruptions, where the appearance and pixel intensities of a displayed CAPTCHA mechanism is substantially consistent. In other examples, the predictive capacity of intensity thresholding may be lowered when there is inconsistency between interruptions or when new workflow states are encountered. In such instances, the predictive capacity may be improved by supplementing, combining, or replacing the intensity thresholding with alternative computer vision techniques better adapted for such environments.

At operation 404, feature matching is performed. In examples, intensity thresholding is performed by a computer vision engine of an interruption detection engine, such as computer vision engine 116 of interruption detection engine 114. Performing feature matching may involve extracting or otherwise identifying one or more visual features of a workflow state. A visual feature may refer to any element, portion, or component of the appearance of a workflow state. For example, a visual feature may include an image, logo, or other portion of a web page or application interface. Identification of visual features in a user interface presented during a particular workflow state may be accomplished by any number of techniques, as will be appreciated to one of skill in the art. Identification of visual features may further be accomplished by analyzing the DOM of a state, which may provide indications as to the location and structure of elements within the state, allowing for better distinction between the elements of a state and the visual features thereof.

In examples, the visual features of a user interface presented during a workflow state may be compared to the pixel intensities of prior depicted user interfaces associated with other workflow states, including prior workflow states at which an interruption occurred. Such a comparison may be accomplished by, for example, identifying common visual features in prior workflow interruptions and examining the present workflow state to determine whether any of those common visual features appear in the present workflow state. Based on the comparison, it may be determined that an interruption has occurred, that an interruption has not occurred, or that there is a certain likelihood that an interruption has occurred. For instance, the comparison may be used to generate a numerical representation of the probability that the present workflow state contains an interruption, such as a confidence value or probability score. Such a determination may be provided, for example, to an interruption detection engine and/or workflow manager to aid in the determination of whether an interruption has occurred and whether to pause an automated workflow for presentation of the interruption.

It will be appreciated that features matching may provide advantages in determining whether an interruption has occurred. For example, feature matching may be a predictor of interruptions in environments in which there is partial consistency between the appearance of interruptions. Partial consistency might occur, for example, when the visual appearance of interruptions is similar from one workflow to the next but not completely identical. That is, the interruptions may contain similar visual elements, but these visual elements may appear with differences in size, rotation, position, and/or pixel intensities in a user interface associated with a workflow state. Feature matching may be a strong predictor of interruptions despite these differences because feature matching considers not only whether a visual feature appears in a workflow state but also whether variants of that feature appear. One example technique that may be utilized during feature matching is RANSAC, or random sample consensus.

At operation 406, template matching is performed. In examples, intensity thresholding is performed by a computer vision engine of an interruption detection engine, such as computer vision engine 116 of interruption detection engine 114. Like feature matching, performing template matching may involve extracting or otherwise identifying one or more visual features of a user interface presented during a workflow state. And similarly, template matching may be used to detect interruptions by comparing the visual features of a present workflow state to the visual features of prior workflow states, including prior workflow states in which an interruption occurred. Template matching, however, may involve identifying a collection of visual features of a workflow state, which may be referred to as a visual template. For instance, in prior workflows, there may be common visual features indicative of an interruption having occurred. Moreover, it may be determined that these common visual features appear in a certain position, size, and arrangement in the prior workflow states.

The arrangement of these visual features may constitute a visual template, which may be used in performing template matching. For example, performing template matching may involve comparing the visual features of a user interface associated with a present workflow state to the visual features—and, more specifically, the visual templates—of one or more user interfaces presented at prior workflow states in which an interruption occurred. If it is determined that a visual template indicative of an interruption appears in the present workflow state, it may be determined that the present workflow state includes an interruption. In examples, the comparison may be used to generate a numerical representation of the probability that the present workflow state contains an interruption, such as a confidence value or probability score. Such a determination may be provided, for example, to an interruption detection engine and/or workflow manager to aid in the determination of whether an interruption has occurred and whether to pause an automated workflow for presentation of the interruption.

In an example involving a CAPTCHA interruption, it may be determined that a CAPTCHA commonly contains an arrangement of visual features, which collectively constitute a CAPTCHA template. Such a template may include certain logos, images, icons. The template may further include not only the visual appearance of those features but also associated functionality, such as an icon providing a means for user input (e.g., a "button" that can be "clicked" by a user). Based on the identification of one or more templates for a CAPTCHA interruption, the visual appearance of a present workflow state may be examined to determine whether any of the one or more templates appears. Based on that examination, it may be determined that a CAPTCHA is present on the page and that an interruption requiring user input has occurred.

It will be appreciated that template matching may provide advantages in determining whether an interruption has occurred. For example, template matching may be a strong predictor of interruptions in environments in which there is consistency between the appearance of workflow interruptions. Consistency between the appearance of interruptions allows for more accurate detection of interruptions based on the templates of those interruptions. In other examples, the predictive capacity of template matching may be lowered when there is inconsistency between interruptions or when new workflow states are encountered. For example, template matching may have lower predictive capacity for interruptions that are sized differently, rotated, or otherwise differ in appearance from one interruption to the next. In such instances, the predictive capacity may be improved by supplementing, combining, or replacing the template matching with alternative computer vision techniques better adapted for such environments. One such technique may include feature matching, which may be capable of detecting interruptions despite differences in size, orientation, arrangement, or position of the visual features of an interruption template.

At operation 408, an interruption is detected. Detecting an interruption may involve receiving the output of one or more of operations 402-406 and, based on those outputs, determining that that interruption has occurred, that an interruption has not occurred, or that there is a certain likelihood that an interruption has occurred. Method 400 may be performed in conjunction with or as an aspect of determination 208 in method 200 of FIG. 2. For example, method 400 may be used to determine whether an interruption has occurred using one or more computer vision techniques, including without limitation the computer vision techniques described in connection with operations 402-406. At operation 408, an output may be provided that allows for the determination to be made whether to pause an automated workflow (e.g., at operation 210) or whether to continue the workflow by proceeding to the next workflow state. It will be appreciated that the operations of method 400 may be performed independently or in conjunction with other interruption detection techniques, such as the DOM analysis techniques described in connection with method 300 or any other techniques for detecting the occurrence of a workflow interruption.

Figure 5:
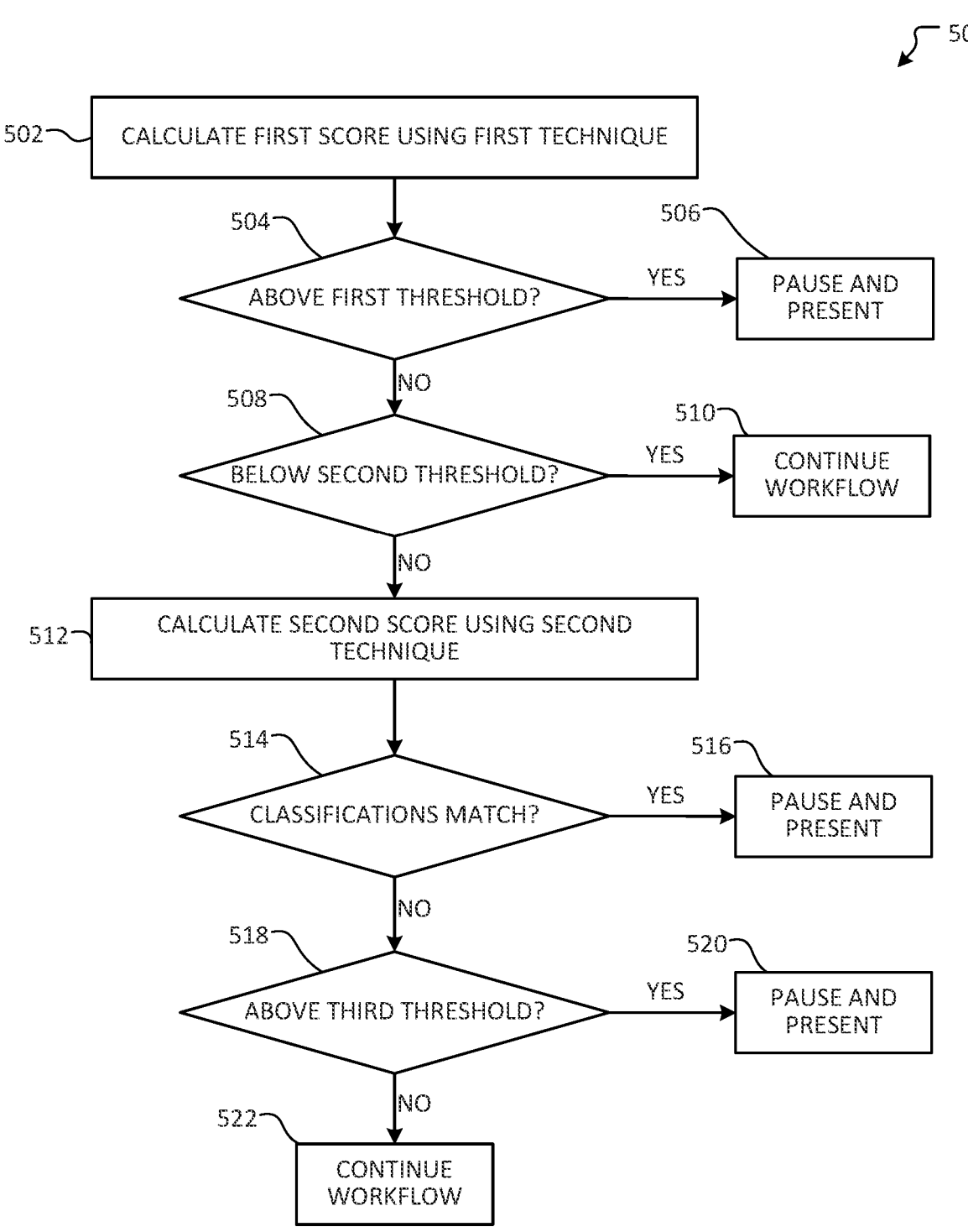
FIG. 5 illustrates an overview of an example method for detecting an interruption during an automated workflow using a first and second detection technique.

FIG. 5 illustrates an overview of an example method 500 for detecting an interruption during an automated workflow using a first and second detection technique. As described herein, there are a number of techniques for detecting an interruption during an automated workflow. These techniques may be employed independently or in combination, and each of the techniques may be especially suited for certain applications or environments. In examples, multiple techniques may be used in combination. Rather than performing all techniques in parallel and attempting to decipher the results of all techniques, it is possible to arrange a method in which the selection of techniques and order of performance thereof is designed to increase the accuracy of interruption detection without placing an undue strain on the resources used for performing the automated workflow. One such example is described in connection with method 500, which illustrates an example overview for using thresholds to determine whether to utilize additional detection techniques to perform interruption detection. While method 500 is illustrated with a first and a second technique, it will be appreciated that more than two techniques may be utilized.

At operation 502, a first technique is utilized and a first score generated. The first technique may be any interruption detection technique, including without limitation any technique utilizing DOM analysis or computer vision, such as the techniques described in connection with FIGS. 3 and 4. Generating a first score may involve generating any numerical representation of the likelihood that an interruption has occurred. For instance, the comparison may be used to generate a numerical representation of the probability that the present workflow state contains an interruption, such as a confidence value or probability score.

Moreover, generating a first score may further involve identifying a type of workflow interruption associated with the score. As described herein, there are a number of types of workflow interruptions that may occur during an automated workflow, including workflows with different appearance, structure, or other attributes. Even within a specific example of a CAPTCHA interruption, there are a number of different types of CAPTCHA interruptions that are possible, including some with significant differences in the requirements involved in resolving the CAPTCHA. For example, some CAPTCHA interruptions may require a user to check a box, while others may require a user to identify certain objects in an array of images. These CAPTCHA interruptions not only differ in the type of user input required for resolution but also in their appearance, structure, and other attributes, including those attributes used for interruption detection in the first instance.

When a first score is generated using a first interruption detection technique, the score may indicate not only the likelihood that an interruption has occurred but may also indicate a particular type of interruption that is likely to have occurred. For example, a score indicating an 80% likelihood that an interruption has occurred may further indicate that the interruption that is likely to have occurred is a particular type of CAPTCHA interruption. The generation of the score and the identification of the type of interruption can be accomplished using any of the interruption detection techniques previously described herein. For example, using computer vision feature matching, certain interruptions may be associated with certain visual features, while other interruptions are associated with other features. Thus, when it is determined whether a user interface of a present workflow state contains visual features indicative of an interruption, that determination may further reveal that the visual features on the present workflow state are indicative of a particular type of interruption, such as a CAPTCHA interruption presenting an array of images for user selection. It will be appreciated that any interruption detection technique, including computer vision, DOM analysis, or other techniques may be capable of classifying the type of interruption that is likely to have occurred in addition to generating a score indicating the probability of such an interruption having occurred.

At determination 504, it is determined whether the first score is above a first threshold. For example, a first threshold may be a probability or confidence value indicating a high degree of confidence that an interruption has occurred. An example of a probability score indicating such a high degree of confidence could be 80%, 85%, 90%, etc. or a confidence value between 0 and 1 indicating high confidence. It will be appreciated that the first threshold may vary depending on the circumstances, and a higher threshold will generally be associated with a higher degree of confidence based on a design preference or requirement. If it is determined that the first score exceeds the first threshold, it may be determined that there is a sufficiently high likelihood of an interruption having occurred that no further analysis is warranted. Thus, if the determination is "YES," flow proceeds to operation 506, and the workflow is paused and presented (e.g., for a user to provide input to resolve an interruption).

If the determination is "NO," flow proceeds to determination 508, where it is determined whether the first score is below a second threshold. The second threshold may be a probability or confidence value indicating a high degree of confidence that an interruption has not occurred. For example, a probability value of less than 10% could indicate that there is a low likelihood that a workflow state contains an interruption. If it is determined that the first score falls below this threshold, it may be determined that there is a sufficiently low likelihood of an interruption having occurred that no further analysis is warranted. Thus, if the determination is "YES," flow proceeds to operation 510, and the workflow is continued (e.g., by advancing to the next workflow state).

If the determination is "NO," then it may be determined that there is uncertainty as to whether an interruption has occurred. For example, if the probability value is not above a first threshold and not below a second threshold, it may be possible that an interruption has occurred but uncertain enough that further analysis is warranted. Thus, if the determination is "NO" at determination 508, flow proceeds to operation 512, where a second interruption technique may be utilized.

At operation 512, a second interruption detection technique is utilized and a second score generated. As with operation 502, any of a number of techniques may be utilized, including DOM analysis or computer vision techniques. And, as with operation 502, generating a second score may further involve classifying the interruption according to a type of interruption that is likely to have occurred based on the analysis performed. The second technique may be selected based on the first technique performed, such as by selecting a second technique that complements the first technique. For example, if a first technique produces highly accurate results in certain environments, a second technique that is highly accurate in different environments may be selected to complement the first technique.

At determination 514, it is determined whether the type of interruption identified by the first technique and the type of interruption identified by the second technique are the same. That is, it may be determined whether the classification performed by the first technique produced the same output as that of the second technique. If the two separate techniques produced the same classification for the interruption using different approaches, it may be additional support that both techniques have accurately identified the interruption. For example, if the first technique identified a 50% likelihood that a particular type of CAPTCHA interruption has occurred and the second technique produced a 60% likelihood that the same type of CAPTCHA interruption has occurred, it may be taken as an indication that there is a strong likelihood that the CAPTCHA interruption has occurred because of the consistency in results between the two techniques. Thus, if the determination 514 is "YES," flow proceeds to operation 516, and the workflow is paused and presented (e.g., by presenting the workflow state to the user for input).

If the determination 514 is "NO," flow proceeds to determination 518, where it is determined whether a third threshold is exceeded. In making this determination, the first and second scores may be compared to the third threshold. In examples, the first and second scores may be added, averaged, or otherwise combined to make this determination. In other examples, the higher or lower of the two scores may be used. For example, if the classifications do not match, it may be taken as an indication that one of the first or second techniques has produced an unreliable indication of the likelihood of an interruption having occurred. In such an example, the higher of the first and second scores may be compared to a third threshold so as to remove the less confident of the two. The first and/or second scores are used to determine whether a third threshold has been exceeded. If the third threshold is exceeded, determination 518 is "YES," and flow proceeds to operation 520, where the workflow is paused and presented. If neither the first or second score (or some combination of the two) exceeds a third threshold, it may be determined that neither of the two interruption detection techniques produced a sufficiently high probability of interruption to warrant pausing the workflow. Thus, if determination 518 is "NO," flow proceeds to operation 522, and the workflow is continued.

FIGS. 6-9 and the associated descriptions provide a discussion of a variety of operating environments in which aspects of the disclosure may be practiced. However, the devices and systems illustrated and discussed with respect to FIGS. 6-9 are for purposes of example and illustration and are not limiting of a vast number of computing device configurations that may be utilized for practicing aspects of the disclosure, described herein.

Figure 6:
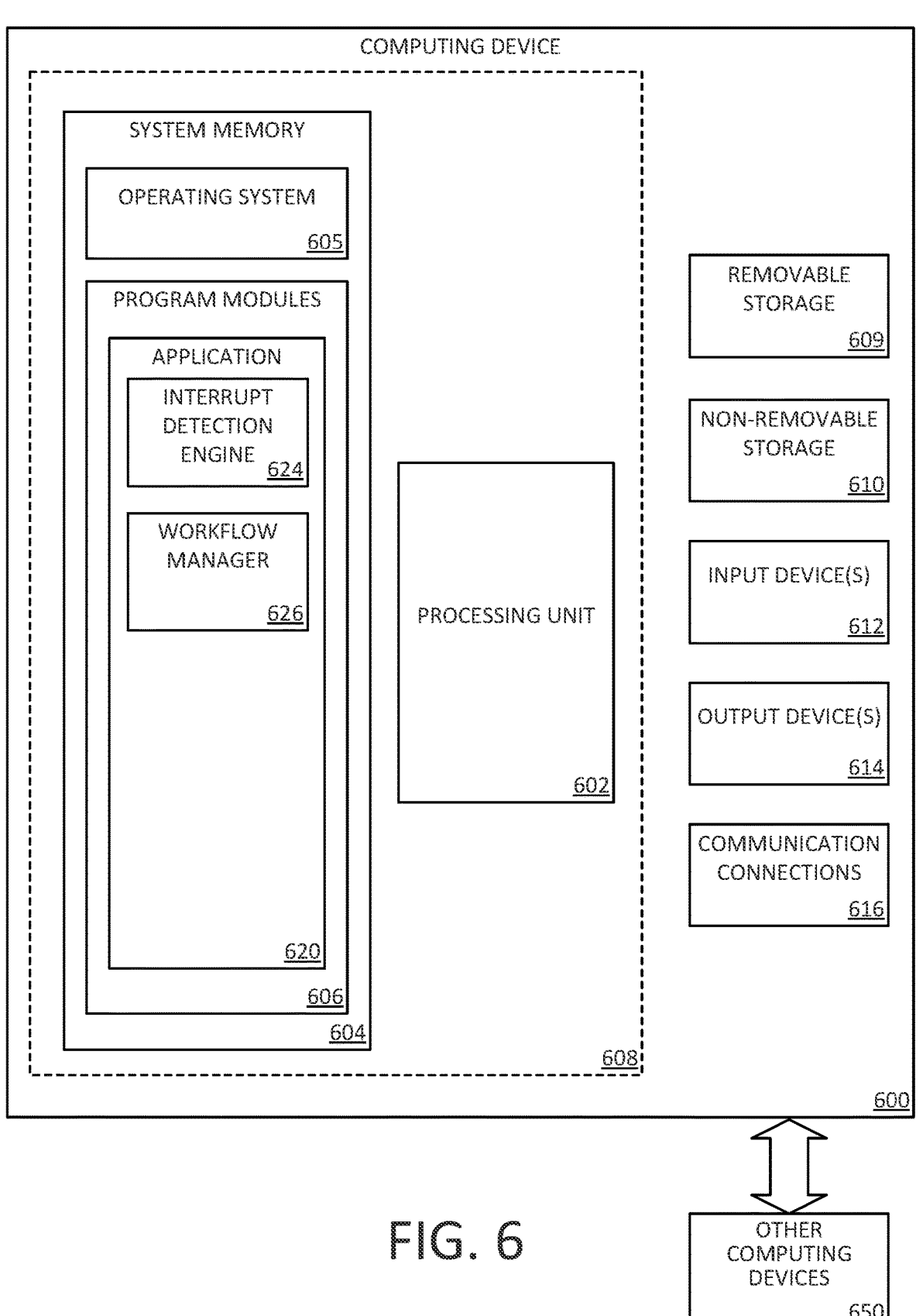
FIG. 6 is a block diagram illustrating example physical components of a computing device with which aspects of the disclosure may be practiced.

FIG. 6 is a block diagram illustrating physical components (e.g., hardware) of a computing device 600 with which aspects of the disclosure may be practiced. The computing device components described below may be suitable for the computing devices described above, including elements 102-106 in FIG. 1. In a basic configuration, the computing device 600 may include at least one processing unit 602 and a system memory 604. Depending on the configuration and type of computing device, the system memory 604 may comprise, but is not limited to, volatile storage (e.g., random access memory), non-volatile storage (e.g., read-only memory), flash memory, or any combination of such memories.

The system memory 604 may include an operating system 605 and one or more program modules 606 suitable for running software application 620, such as one or more components supported by the systems described herein. As examples, system memory 604 may store interruption detection engine 624 and workflow manager 626. The operating system 605, for example, may be suitable for controlling the operation of the computing device 600.

Furthermore, embodiments of the disclosure may be practiced in conjunction with a graphics library, other operating systems, or any other application program and is not limited to any particular application or system. This basic configuration is illustrated in FIG. 6 by those components within a dashed line 608. The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by a removable storage device 609 and a non-removable storage device 610.

As stated above, a number of program modules and data files may be stored in the system memory 604. While executing on the processing unit 602, the program modules 606 (e.g., application 620) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 600 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 600 may also have one or more input device(s) 612 such as a keyboard, a mouse, a pen, a sound or voice input device, a touch or swipe input device, etc. The output device(s) 614 such as a display, speakers, a printer, etc. may also be included. The aforementioned devices are examples and others may be used. The computing device 600 may include one or more communication connections 616 allowing communications with other computing devices 650. Examples of suitable communication connections 616 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 604, the removable storage device 609, and the non-removable storage device 610 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 7A:
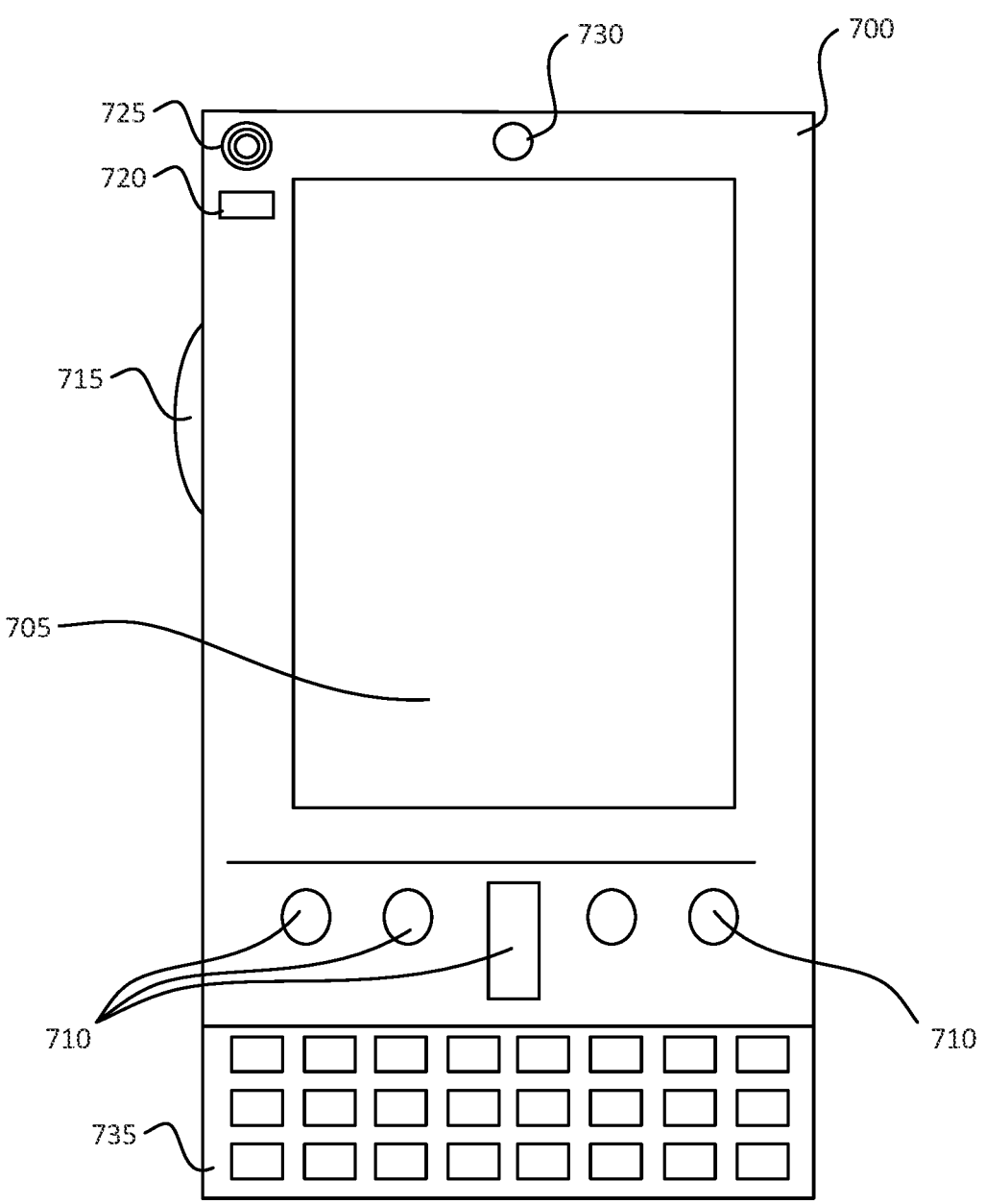
FIGS. 7A and 7B are simplified block diagrams of a mobile computing device with which aspects of the present disclosure may be practiced.
Figure 7B:
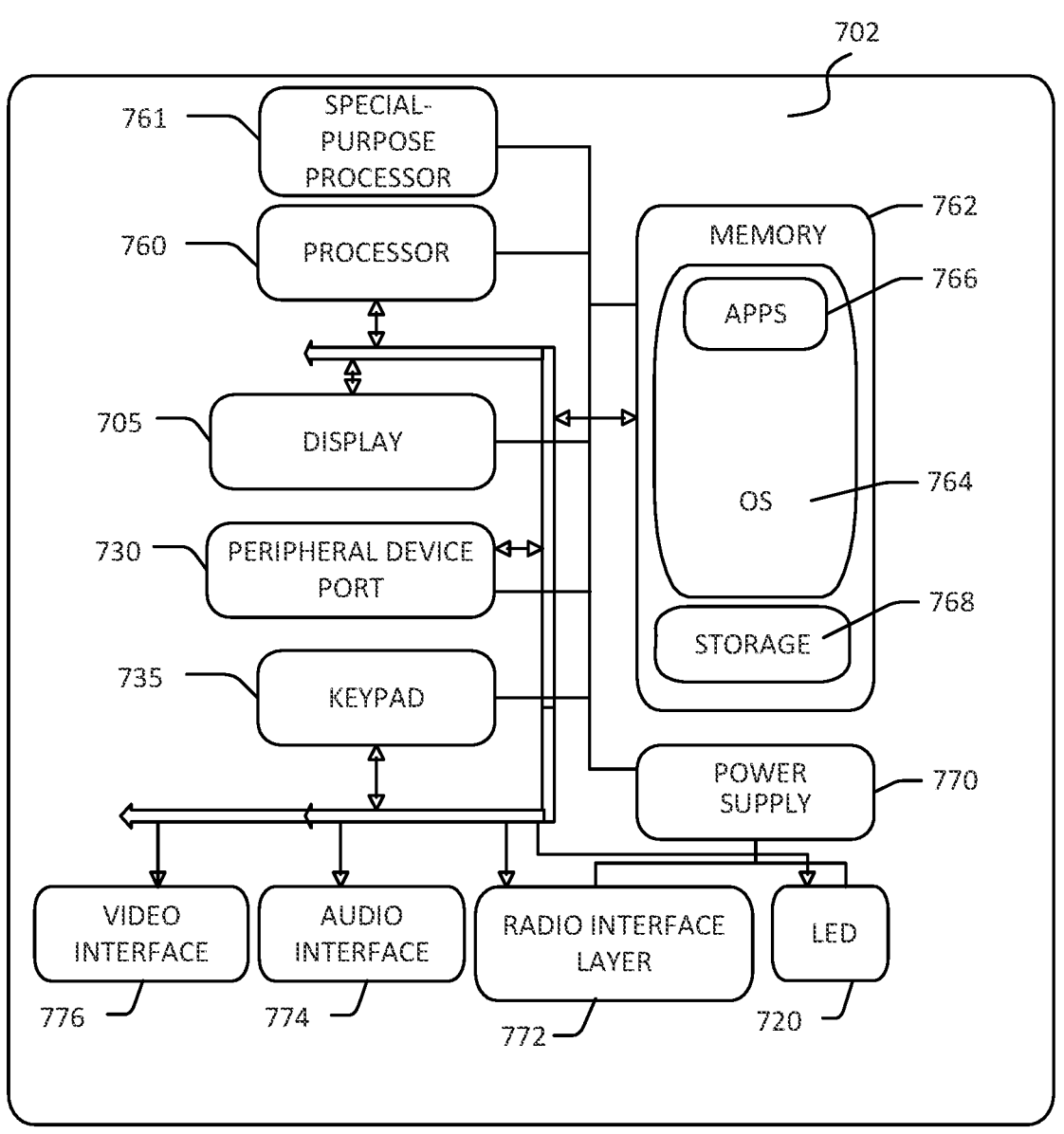

FIGS. 7A and 7B illustrate a mobile computing device 700, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 7A, one aspect of a mobile computing device 700 for implementing the aspects is illustrated. In a basic configuration, the mobile computing device 700 is a handheld computer having both input elements and output elements. The mobile computing device 700 typically includes a display 705 and one or more input buttons 710 that allow the user to enter information into the mobile computing device 700. The display 705 of the mobile computing device 700 may also function as an input device (e.g., a touch screen display).

If included, an optional side input element 715 allows further user input. The side input element 715 may be a rotary switch, a button, or any other type of manual input element. In alternative aspects, mobile computing device 700 may incorporate more or less input elements. For example, the display 705 may not be a touch screen in some embodiments.

In yet another alternative embodiment, the mobile computing device 700 is a portable phone system, such as a cellular phone. The mobile computing device 700 may also include an optional keypad 735. Optional keypad 735 may be a physical keypad or a "soft" keypad generated on the touch screen display.

In various embodiments, the output elements include the display 705 for showing a graphical user interface (GUI), a visual indicator 720 (e.g., a light emitting diode), and/or an audio transducer 725 (e.g., a speaker). In some aspects, the mobile computing device 700 incorporates a vibration transducer for providing the user with tactile feedback. In yet another aspect, the mobile computing device 700 incorporates input and/or output ports, such as an audio input (e.g., a microphone jack), an audio output (e.g., a headphone jack), and a video output (e.g., a HDMI port) for sending signals to or receiving signals from an external device.

FIG. 7B is a block diagram illustrating the architecture of one aspect of a mobile computing device. That is, the mobile computing device 700 can incorporate a system (e.g., an architecture) 702 to implement some aspects. In one embodiment, the system 702 is implemented as a "smart phone" capable of running one or more applications (e.g., browser, e-mail, calendaring, contact managers, messaging clients, games, and media clients/players). In some aspects, the system 702 is integrated as a computing device, such as an integrated personal digital assistant (PDA) and wireless phone.

One or more application programs 766 may be loaded into the memory 762 and run on or in association with the operating system 764. Examples of the application programs include phone dialer programs, e-mail programs, personal information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700 described herein (e.g., a signal identification engine, a context determination engine, a semantic action generator, etc.).

The system 702 has a power supply 770, which may be implemented as one or more batteries. The power supply 770 might further include an external power source, such as an AC adapter or a powered docking cradle that supplements or recharges the batteries.

The system 702 may also include a radio interface layer 772 that performs the function of transmitting and receiving radio frequency communications. The radio interface layer 772 facilitates wireless connectivity between the system 702 and the "outside world," via a communications carrier or service provider. Transmissions to and from the radio interface layer 772 are conducted under control of the operating system 764. In other words, communications received by the radio interface layer 772 may be disseminated to the application programs 766 via the operating system 764, and vice versa.

The visual indicator 720 may be used to provide visual notifications, and/or an audio interface 774 may be used for producing audible notifications via the audio transducer 725. In the illustrated embodiment, the visual indicator 720 is a light emitting diode (LED) and the audio transducer 725 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 725, the audio interface 774 may also be coupled to a microphone to receive audible input, such as to facilitate a telephone conversation. In accordance with embodiments of the present disclosure, the microphone may also serve as an audio sensor to facilitate control of notifications, as will be described below. The system 702 may further include a video interface 776 that enables an operation of an on-board camera 730 to record still images, video stream, and the like.

A mobile computing device 700 implementing the system 702 may have additional features or functionality. For example, the mobile computing device 700 may also include additional data storage devices (removable and/or non-removable) such as, magnetic disks, optical disks, or tape. Such additional storage is illustrated in FIG. 7B by the non-volatile storage area 768.

Data/information generated or captured by the mobile computing device 700 and stored via the system 702 may be stored locally on the mobile computing device 700, as described above, or the data may be stored on any number of storage media that may be accessed by the device via the radio interface layer 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio interface layer 772 or via a distributed computing network. Similarly, such data/information may be readily transferred between computing devices for storage and use according to well-known data/information transfer and storage means, including electronic mail and collaborative data/information sharing systems.

Figure 8:
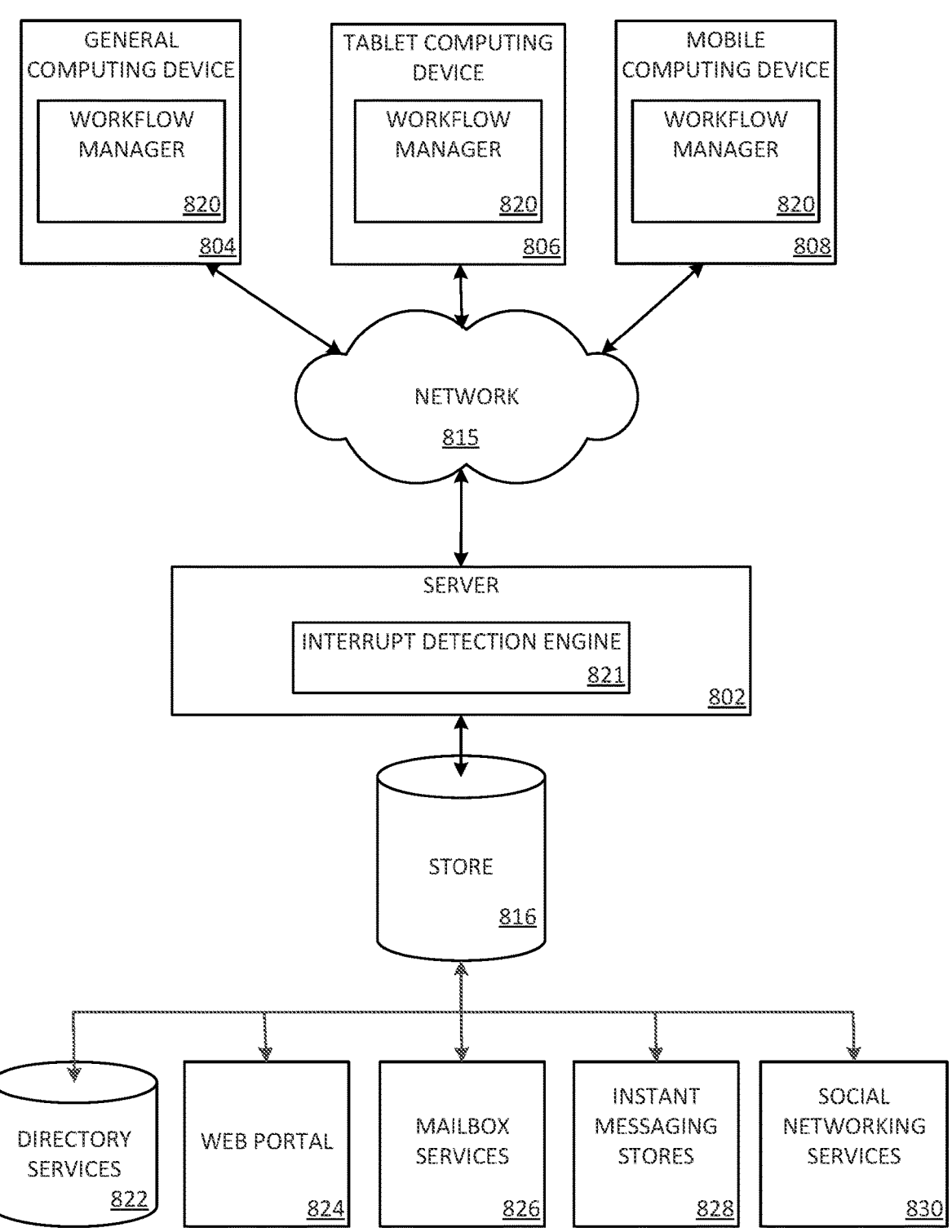
FIG. 8 is a simplified block diagram of a distributed computing system in which aspects of the present disclosure may be practiced.

FIG. 8 illustrates one aspect of the architecture of a system for processing data received at a computing system from a remote source, such as a personal computer 804, tablet computing device 806, or mobile computing device 808, as described above. Content displayed at server device 802 may be stored in different communication channels or other storage types. For example, various documents may be stored using a directory service 822, a web portal 824, a mailbox service 826, an instant messaging store 828, or a social networking site 830.

A workflow manager 820 may be employed by a client that communicates with server device 802, and/or interruption detection engine 821 may be employed by server device 802. Additionally or alternatively, workflow manager 820 may be employed by server device 802 in combination or in conjunction with interruption detection engine 821. The server device 802 may provide data to and from a client computing device such as a personal computer 804, a tablet computing device 806 and/or a mobile computing device 808 (e.g., a smart phone) through a network 815. By way of example, the computer system described above may be embodied in a personal computer 804, a tablet computing device 806 and/or a mobile computing device 808 (e.g., a smart phone). Any of these embodiments of the computing devices may obtain content from the store 816, in addition to receiving graphical data useable to be either pre-processed at a graphic-originating system, or post-processed at a receiving computing system.

Figure 9:
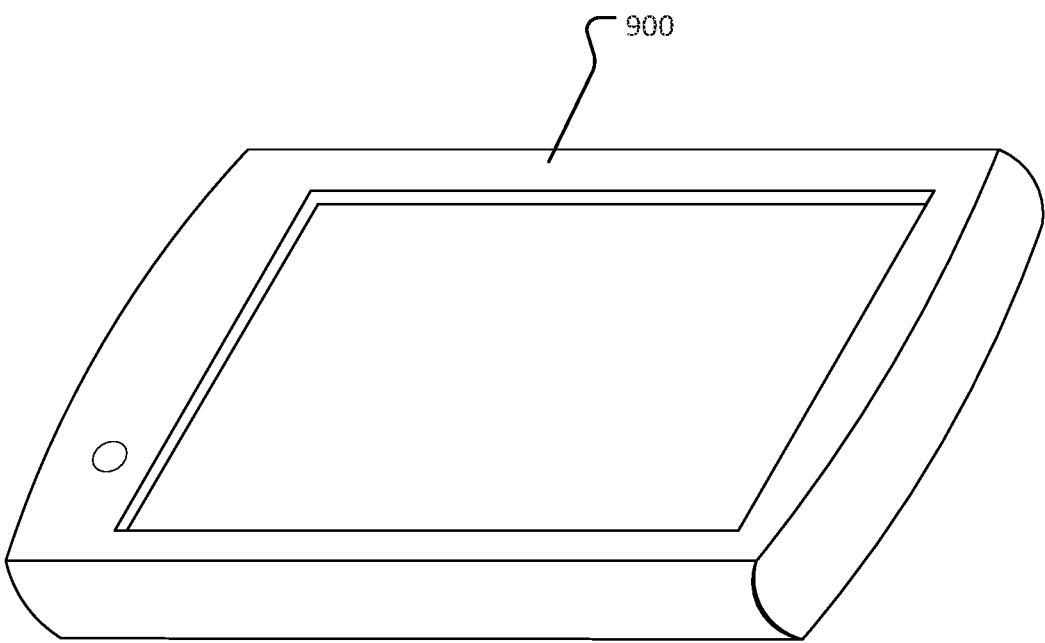
FIG. 9 illustrates a tablet computing device for executing one or more aspects of the present disclosure.

FIG. 9 illustrates an exemplary tablet computing device 900 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As will be understood from the foregoing disclosure, one aspect of the technology relates to a system comprising: a processor and a memory storing instructions that, when executed by the processor, cause the system to perform a set of operations comprising: initiating an automated workflow, the automated workflow comprising a plurality of workflow states; detecting a change from a first workflow state to a second workflow state; examining an attribute of the second workflow state; determining, based on the examining, that the second workflow state includes a workflow interruption requiring a user input; pausing the automated workflow; presenting the second workflow state to the user; receiving an indication that the user input has been received; and based on receiving the indication, resuming the automated workflow. In another aspect, the technology relates to a method for processing semantic user input to controlling a computing device. In examples, the automated workflow is associated with a set of workflow instructions, the workflow instructions comprising a series of actions for proceeding through the plurality of workflow states. In examples, the workflow interruption is a CAPTCHA request. In other examples, the user input has been received when the CAPTCHA request has been completed. In still other examples, determining that the second workflow state includes a workflow interruption comprises: extracting a document object model (DOM) of the second workflow state; determining, based on the DOM, that the second workflow state comprises an iframe; and identifying, based on the DOM, a keyword in a markup of the iframe, wherein the keyword indicates a workflow interruption. In examples, the keyword is "CAPTCHA." In still other examples, examining the attribute of the second workflow state comprises: identifying a visual feature of a user interface presented during the second workflow state; generating a visual feature score indicating a degree of similarity between the visual feature of the user interface and a visual feature associated with a prior workflow interruption. In examples, the attribute is a first attribute, wherein the prior workflow interruption is a first prior workflow interruption, and wherein the set of operations further comprises instructions for examining a second attribute, and wherein examining the second attribute comprises: determining pixel intensities of the second attribute presented in the user interface associated with second workflow state; and generating a pixel intensity score indicating a degree of similarity between the pixel intensities of the second workflow state and pixel intensities of a second prior workflow interruption. In other examples, determining that the second workflow state includes a workflow interruption comprises: generating a computer-vision score based on the pixel-intensity score and the visual-feature score; if the first workflow-interruption type and the second workflow-interruption type are the same, comparing the computer-vision score to a first threshold and determining that the computer-vision score exceeds the first threshold; and if the first workflow-interruption type and the second workflow-interruption type are not the same, comparing the computer-vision score to a second threshold and determining that the computer-vision score exceeds the first threshold, wherein the second threshold is higher than the first threshold. In still other examples, the attribute is a first attribute, wherein the prior workflow interruption is a first prior workflow interruption, wherein the set of operations further comprises examining a second attribute, and wherein examining the second attribute comprises: extracting a document object model (DOM) associated with the second workflow state; determining, based on the DOM, that the second workflow state comprises an iframe; and identifying, based on the DOM, a portion of a markup of the iframe that has appeared in a second prior workflow interruption.

In a further aspect, the technology relates to a method for detecting an interruption in an automated workflow. The method comprises: initiating an automated workflow, the automated workflow comprising a plurality of workflow states; detecting a change from a first workflow state to a second workflow state; examining an attribute of the second workflow state; determining, based on the examining, that the second workflow state includes a workflow interruption requiring a user input; pausing the automated workflow; presenting the second workflow state to the user; receiving an indication that the user input has been received; and based on receiving the indication, resuming the automated workflow. In examples, the workflow interruption is a CAPTCHA request. In other examples, examining the attribute of the second workflow state comprises: extracting a document object model (DOM) of the second workflow state; determining, based on the DOM, that the second workflow state comprises an iframe; and identifying, based on the DOM, a keyword in a markup of the iframe, wherein the keyword is "CAPTCHA." In still other examples, examining the attribute of the second workflow state comprises: identifying a visual feature of a user interface presented during the second workflow state; and determining a degree of similarity between the visual feature of the user interface associated with the second workflow state and a visual feature associated with a prior workflow interruption. In examples, examining the attribute of the second workflow state comprises: determining pixel intensities of the user interface associated with the second workflow state; and determining a degree of similarity between the pixel intensities of the user interface and pixel intensities of a prior workflow interruption. In other examples, examining the attribute of the second workflow state comprises further comprises: identifying a visual feature of a user interface presented during the second workflow state; and determining a degree of similarity between the visual feature of the user interface associated with the second workflow state and a visual feature associated with a prior workflow interruption. In still other examples, determining the degree of similarity comprises generating a visual feature score. In examples, determining, based on the examining, that the second workflow state includes a workflow interruption comprises comparing the visual feature score to a visual feature threshold.

In a further aspect, the technology relates to a computer-storage medium encoding computer-executable instructions that, when executed by at least one processor, perform a method comprising: initiating an automated workflow, the automated workflow comprising a plurality of workflow states; detecting a change from a first workflow state to a second workflow state; identifying a visual feature of a user interface presented during the second workflow state; generating a visual feature score indicating a degree of similarity between the visual feature of the user interface associated with the second workflow state and a prior visual feature associated with a prior workflow interruption; determining pixel intensities of the visual feature of the user interface associated with the second workflow state; and generating a pixel intensity score indicating a degree of similarity between the pixel intensities of the visual feature of the user interface associated with the second workflow state and pixel intensities of the prior visual feature associated with the prior workflow interruption; determining, based on the visual feature score and the pixel intensity score, that the second workflow state includes a workflow interruption; pausing the automated workflow; receiving an indication that the user input has been received; and based on receiving the indication, resuming the automated workflow.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use claimed aspects of the disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:

at least one processor; and memory storing instructions that, when executed by the at least one processor, causes the system to perform a set of operations, the set of operations comprising:

initiating an automated workflow, the automated work-flow comprising a plurality of workflow states, the initiating comprising loading an indication of a work-flow state into the memory to facilitate performing the operations to automate the workflow;

detecting a change from a first workflow state to a second workflow state;

extracting a document object model (DOM) of the second workflow state;

analyzing the DOM to detect a first DOM element com-prising markup content;

programmatically detecting, based on the markup content and one or more attributes of the first DOM element, a workflow interruption requiring a user input;

classifying, based on the one or more attributes of the first DOM element, a type of workflow interruption by comparing the one or more attributes to DOM attributes associated with known workflow interruptions;

modifying execution of the automated workflow based on the classified type of workflow interruption, including pausing the automated workflow and storing an indi-cation of the paused workflow state in the memory;

causing presentation of a representation of the second workflow state to a user;

receiving an indication that the user input has been received; and based on receiving the indication, accessing from the memory the indication of the paused workflow state and resuming the automated workflow.

2. The system of claim 1, wherein the automated work-flow is associated with a set of workflow instructions, the workflow instructions comprising a series of actions for proceeding through the plurality of workflow states.

3. The system of claim 1, wherein the workflow interrup-tion comprises a CAPTCHA request.

4. The system of claim 3, wherein the user input has been received when the CAPTCHA request has been completed.

5. The system of claim 1, wherein the first DOM element comprises an iframe, and the markup content includes a keyword.

6. The system of claim 5, wherein the keyword indicates a "CAPTCHA" interruption.

7. The system of claim 1, wherein the known workflow interruptions include a prior workflow interruption;

wherein the first DOM element is associated with a visual feature of a user interface presented during the second workflow state;

wherein classifying the type of workflow interruption further comprises:

identifying the visual feature; and determining a degree of similarity between the visual feature and a visual feature associated with the prior workflow interruption;

wherein the degree of similarity is represented by a visual feature score, and wherein the type of workflow interruption is determined based on the visual feature score exceeding a threshold.

8. The system of claim 7, wherein the set of operations further comprises:

determining pixel intensities of the first DOM element or a second DOM element of the DOM of the second workflow state; and generating a pixel intensity score indicating a degree of similarity between the pixel intensities of the first or second DOM elements and pixel intensities associated with the prior workflow interruption; and classifying the type of workflow interruption based on a combination of the visual feature score and the pixel intensity score.

9. The system of claim 8, wherein the pixel intensity score further indicates a first workflow-interruption type to which the pixel intensities of the second workflow state are the most similar, and wherein the visual features score further indicates a second workflow-interruption type to which the visual feature of the second workflow state is the most similar.

10. The system of claim 9, wherein determining that the second workflow state includes a workflow interruption comprises:

generating a computer-vision score based on the pixel-intensity score and the visual-feature score;

if the first workflow-interruption type and the second workflow-interruption type are the same, comparing the computer-vision score to a first threshold and deter-mining that the computer-vision score exceeds the first threshold; and if the first workflow-interruption type and the second workflow-interruption type are not the same, compar-ing the computer-vision score to a second threshold and determining that the computer-vision score exceeds the first threshold, wherein the second threshold is higher than the first threshold.

11. The system of claim 1, wherein classifying the type of workflow interruption comprises comparing the one or more attributes of the first DOM element to DOM attributes associated with known workflow interruptions stored in interruption detection data.

12. A computer-implemented method for detecting a workflow interruption, the method comprising:

initiating an automated workflow, the automated work-flow comprising a plurality of workflow states;

detecting a change from a first workflow state to a second workflow state;

extracting a document object model (DOM) of the second workflow state;

analyzing the DOM to detect a DOM element comprising markup content;

programmatically detecting, based on the markup content and one or more attributes of the DOM element, a workflow interruption requiring a user input;

classifying, based on the one or more attributes of the DOM element, a type of workflow interruption by comparing the one or more attributes to DOM attributes associated with known workflow interruptions;

modifying execution of the automated workflow based on the classified type of workflow interruption, including pausing the automated workflow;

causing presentation of the second workflow state to a user;

receiving an indication that the user input has been received; and based on receiving the indication, resuming the automated workflow.

13. The computer-implemented method of claim 12, wherein the workflow interruption comprises a CAPTCHA request.

14. The computer-implemented method of claim 13, wherein examining the attribute of the second workflow state comprises:

determining, based on the indication of the DOM stored in the database, that the second workflow state comprises an iframe; and identifying the keyword in a markup of the iframe, wherein the keyword is "CAPTCHA".

15. The computer-implemented method of claim 13, wherein examining the attribute of the second workflow state comprises:

identifying a visual feature of a user interface presented during the second workflow state; and determining a degree of similarity between the visual feature of the user interface associated with the second workflow state and a visual feature associated with a prior workflow interruption.

16. The computer-implemented method of claim 13, wherein examining the attribute of the second workflow state comprises:

determining pixel intensities of the user interface associated with the second workflow state; and determining a degree of similarity between the pixel intensities of the user interface and pixel intensities of a prior workflow interruption.

17. The computer-implemented method of claim 14, wherein examining the attribute of the second workflow state comprises further comprises:

identifying a visual feature of a user interface presented during the second workflow state; and determining a degree of similarity between the visual feature of the user interface associated with the second workflow state and a visual feature associated with a prior workflow interruption.

18. The computer-implemented method of claim 17, wherein determining the degree of similarity comprises generating a visual feature score.

19. The computer-implemented method of claim 18, wherein determining, based on the examining, that the second workflow state includes a workflow interruption comprises comparing the visual feature score to a visual feature threshold.

20. A non-transitory computer-storage medium encoding computer-executable instructions that, when executed by at least one processor, perform a method comprising:

initiating an automated workflow, the automated workflow comprising a plurality of workflow states;

detecting a change from a first workflow state to a second workflow state;

identifying a visual feature of a user interface presented during the second workflow state;

storing an indication of the visual feature in a memory;

executing a computer vision program to process the indication of the visual feature by:

accessing from the memory an indication of and a prior visual feature associated with a prior workflow interruption;

generating, based on the indication of the visual feature stored in the memory, a visual feature score indicating a degree of similarity between the visual feature of the user interface associated with the second workflow state and the prior visual feature associated with the prior workflow interruption;

determining pixel intensities of the visual feature of the user interface associated with the second workflow state;

accessing, from the memory, pixel intensities of the prior visual feature associated with the prior workflow interruption; and generating a pixel intensity score indicating a degree of similarity between the pixel intensities of the visual feature of the user interface associated with the second workflow state and pixel intensities of the prior visual feature associated with the prior workflow interruption;

determining, based on the visual feature score and the pixel intensity score, that the second workflow state includes a workflow interruption;

pausing the automated workflow;

receiving an indication that the user input has been received; and based on receiving the indication, resuming the automated workflow.

* * * * *